United States Patent
Kitayama et al.

(10) Patent No.: US 10,933,614 B2
(45) Date of Patent: Mar. 2, 2021

(54) RESIN COMPOSITION, AND MOLDED ARTICLE AND FILM THEREOF

(71) Applicant: KANEKA CORPORATION, Osaka (JP)

(72) Inventors: Fuminobu Kitayama, Hyogo (JP); Haruki Koyama, Osaka (JP); Hiroki Sawada, Hyogo (JP); Nagayoshi Adachi, Osaka (JP)

(73) Assignee: KANEKA CORPORATION, Osaka (JP)

( * ) Notice: Subject to any disclaimer, the term of this patent is extended or adjusted under 35 U.S.C. 154(b) by 141 days.

(21) Appl. No.: 16/148,631

(22) Filed: Oct. 1, 2018

(65) Prior Publication Data

US 2019/0031845 A1 Jan. 31, 2019

Related U.S. Application Data

(63) Continuation-in-part of application No. PCT/JP2017/013607, filed on Mar. 31, 2017.

(30) Foreign Application Priority Data

Mar. 31, 2016 (JP) .............. JP2016-073201
Oct. 26, 2016 (JP) .............. JP2016-209993

(51) Int. Cl.
| | | |
|---|---|---|
| B32B 27/30 | (2006.01) | |
| C08F 265/06 | (2006.01) | |
| C08F 8/48 | (2006.01) | |
| C08F 220/14 | (2006.01) | |
| C08L 51/00 | (2006.01) | |
| C08L 33/04 | (2006.01) | |
| C08L 33/24 | (2006.01) | |
| C08L 33/12 | (2006.01) | |
| B32B 7/022 | (2019.01) | |
| C08J 5/18 | (2006.01) | |
| C08F 8/30 | (2006.01) | |
| C08F 220/18 | (2006.01) | |

(52) U.S. Cl.
CPC .............. *B32B 27/30* (2013.01); *B32B 7/022* (2019.01); *B32B 27/308* (2013.01); *C08F 8/30* (2013.01); *C08F 8/48* (2013.01); *C08F 220/14* (2013.01); *C08F 265/06* (2013.01); *C08J 5/18* (2013.01); *C08L 33/04* (2013.01); *C08L 33/12* (2013.01); *C08L 33/24* (2013.01); *C08L 51/00* (2013.01); *C08F 220/1804* (2020.02); *C08J 2333/14* (2013.01); *C08J 2451/06* (2013.01)

(58) Field of Classification Search
CPC ....... C08L 33/00–33/26; C08F 220/00–220/70
See application file for complete search history.

(56) References Cited

U.S. PATENT DOCUMENTS

| 3,793,402 | A | 2/1974 | Owens | |
|---|---|---|---|---|
| 6,218,447 | B1 | 4/2001 | Sugaya et al. | |
| 2016/0053104 | A1* | 2/2016 | Kitayama | C08J 5/18 524/504 |

FOREIGN PATENT DOCUMENTS

| EP | 2982711 A1 | 2/2016 | |
|---|---|---|---|
| JP | S55-27576 B2 | 7/1980 | |
| JP | S63-122748 A | 5/1988 | |
| JP | H05-140410 A | 6/1993 | |
| JP | H06-179793 A | 6/1994 | |
| JP | H09-309938 A | 12/1997 | |
| JP | 2006-299038 A | 11/2006 | |
| JP | 3960631 B2 | 8/2007 | |
| JP | 2009-30001 A | 2/2009 | |
| JP | 2012-052023 A | 3/2012 | |
| WO | 2013/028403 A1 | 2/2013 | |
| WO | WO-2014162369 A1 * | 10/2014 | ............... G02B 1/04 |
| WO | 2015/079694 A1 | 6/2015 | |

OTHER PUBLICATIONS

Machine translation of KR2005-0079296. Retrieved Oct. 22, 2020.*
International Search Report issued in International Application No. PCT/JP2017/013607, dated Jun. 27, 2017 (2 pages).
Extended European Search Report issued in European Application No. 17775539.4, dated Sep. 23, 2019 (12 pages).

\* cited by examiner

*Primary Examiner* — Prashant J Khatri
(74) *Attorney, Agent, or Firm* — Osha Bergman Watanabe & Burton LLP

(57) ABSTRACT

An acrylic resin composition includes an acrylic resin and a graft copolymer. The graft copolymer includes an inner layer and an outer layer. The inner layer is a soft polymer (B) having, as structural units, a monomer mixture (b) containing 40 to 99 wt % of an alkyl acrylate ester, 1 to 60 wt % of benzyl (meth)acrylate, and 0 to 40 wt % of another monomer and 0.1 to 5 parts by weight of a polyfunctional monomer; and the outer layer is a hard polymer (C) having, as structural units, a monomer mixture (c) containing 60 to 100 wt % of an alkyl methacrylate ester, 0 to 10 wt % of benzyl (meth)acrylate, and 40 to 0 w % of another monomer and 0 to 10 parts by weight of a polyfunctional monomer.

11 Claims, 2 Drawing Sheets

[Fig. 1]
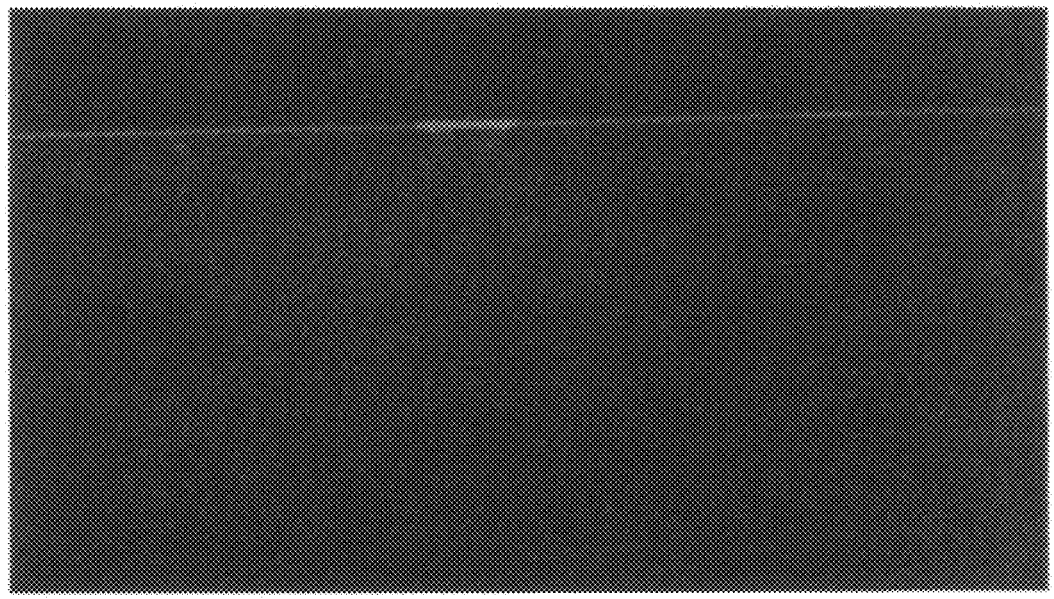
[Fig. 2]
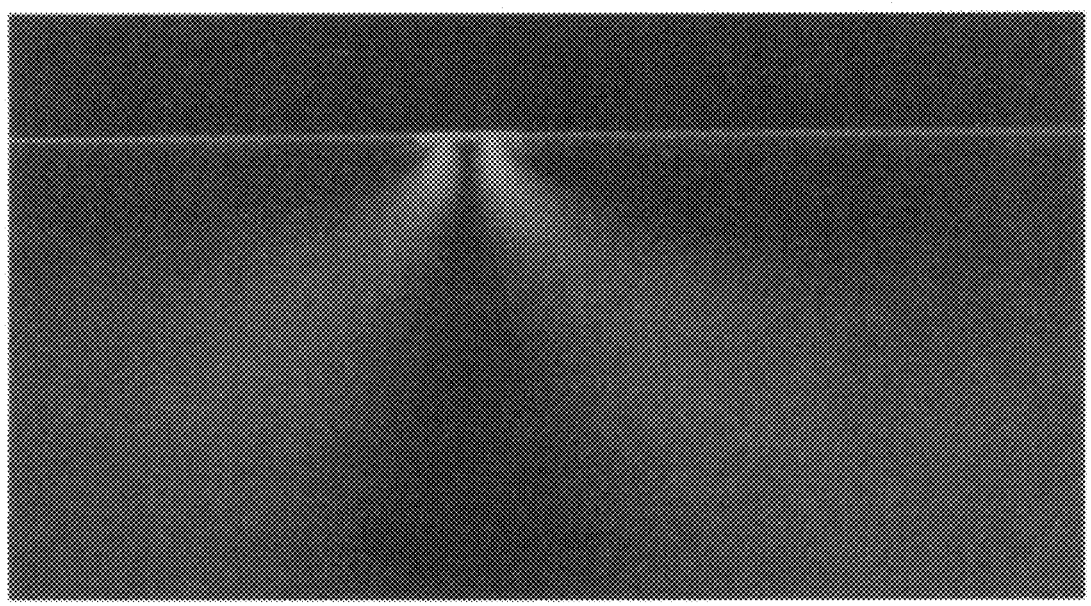

[Fig. 3]
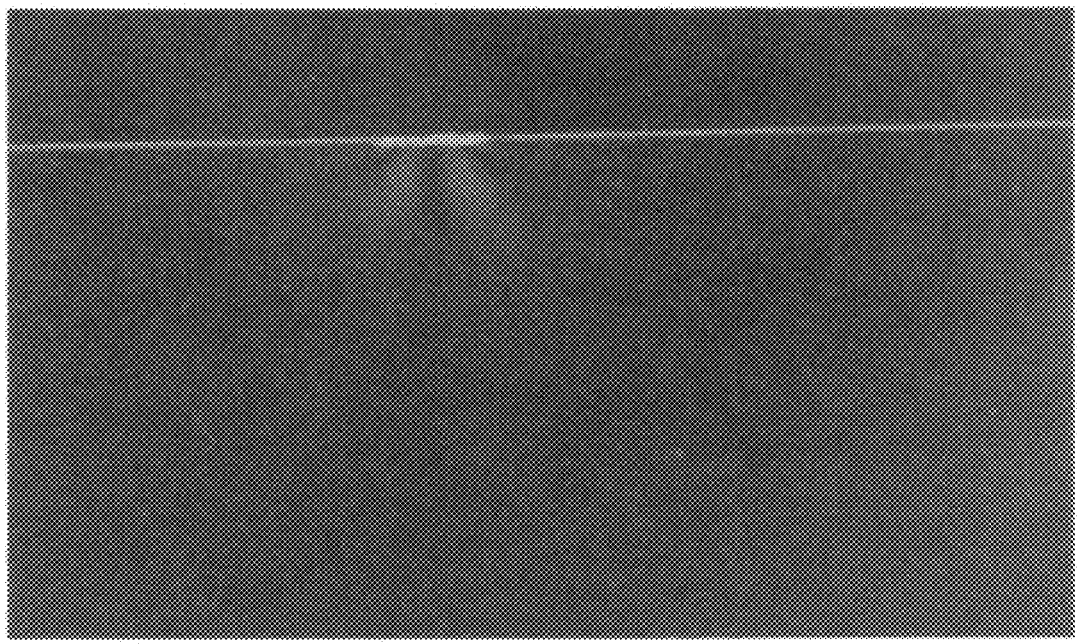
[Fig. 4]
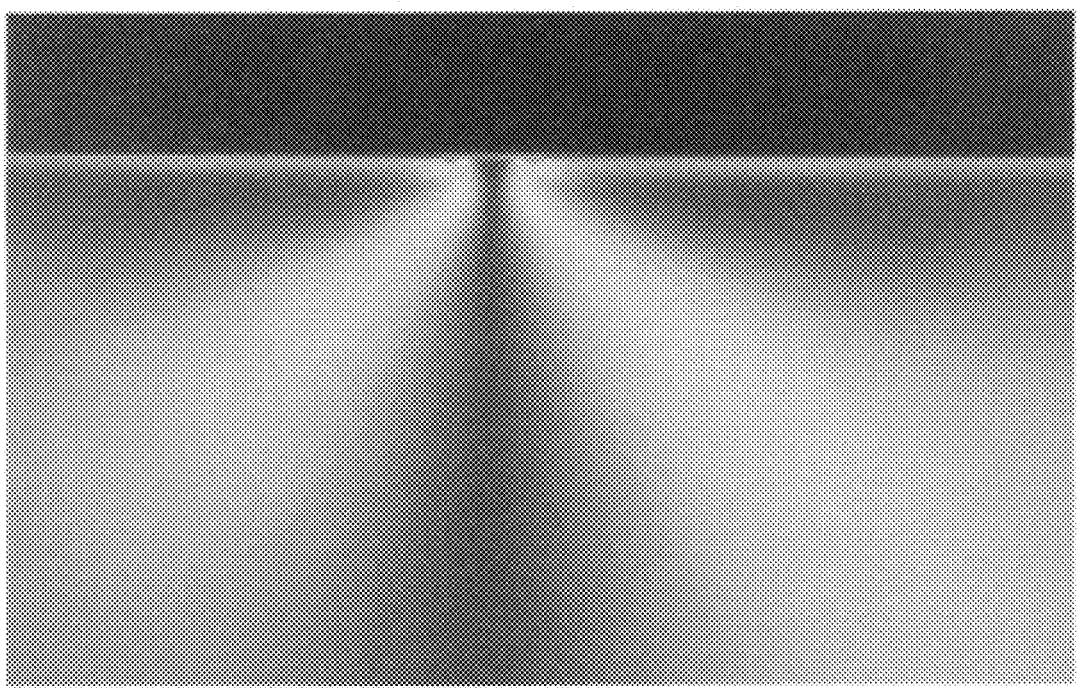

RESIN COMPOSITION, AND MOLDED ARTICLE AND FILM THEREOF

TECHNICAL FIELD

One or more embodiments of the present invention relate to a resin composition containing an acrylic resin and a graft copolymer, and a molded article and a film thereof.

BACKGROUND ART

Acrylic resins are excellent polymers used in large amounts in various industrial fields for their excellent transparency, color, appearance, weather resistance, luster, and processability. Particularly, films formed by molding acrylic resins are used for various purposes, such as internal and exterior materials for automobiles, exterior materials for electric devices such as mobile phones and smartphones, and interior and exterior building materials such as floor materials, by taking advantage of their excellent transparency, appearance, and weather resistance. Particularly, in recent years, acrylic resins have been used for optical members of liquid crystal displays, organic EL displays, and the like by taking advantage of their excellent optical properties.

However, an essential disadvantage of acrylic resins is their poor impact resistance. As general methods for improving the impact resistance of an acrylic resin, various methods have been proposed in which a graft copolymer having a rubber layer (rubber-containing graft copolymer) is added to an acrylic resin to develop strength (see, for example, PTL 1 to PTL 6).

CITATION LIST

Patent Literature

PTL 1: JP-B-55-27576
PTL 2: Japanese Patent No. 3960631
PTL 3: JP-A-6-179793
PTL 4: JP-A-5-140410
PTL 5: JP-A-2009-30001
PTL 6: JP-A-2012-52023

However, when an acrylic resin composition containing a conventional rubber-containing graft copolymer is molded, optical isotropy is inevitably impaired, because a phase difference occurs particularly in the near-gate area of an injection molded article or occurs in the entirety of a stretched film, even when an acrylic resin that is less likely to cause a phase difference is used as a matrix. Therefore, this is considered to be birefringence caused by extreme deformation/orientation of a rubber-containing graft copolymer, especially a cross-linked rubber structure in a molded article.

SUMMARY

One or more embodiments of the present invention provide an acrylic resin composition that can provide a molded article or film that is excellent in mechanical properties, such as impact resistance and bending resistance, transparency, and color and that is less likely to cause a phase difference, and a molded article and a film thereof.

The present inventors have intensively studied, and as a result have focused attention on the structure of a polymer constituting the cross-linked rubber structure of a rubber-containing graft copolymer. That is, as described in the above patent literatures, an aromatic vinyl monomer, such as styrene, having a high refractive index is generally used to match the refractive index of a rubber-containing graft copolymer to that of an acrylic resin as a matrix so that a molded article can maintain transparency. However, polystyrene is a polymer having extremely large birefringence when oriented (orientation birefringence). The present inventors have found that when a rubber-containing graft copolymer having a large amount of aromatic vinyl monomer, such as styrene, as a structural unit is used, the rubber-containing graft copolymer is oriented or deformed in a portion of a molded article in which polymer chains are easily oriented so that a phase difference occurs.

The present inventors have studied various structures of a graft copolymer to provide a molded article or film that is less likely to cause a phase difference even when the rubber-containing graft copolymer is oriented or deformed therein and that is excellent in mechanical properties such as impact resistance and bending resistance, transparency, and color. As a result, the present inventors have found that a specific monomer may be used in a polymer constituting the cross-linked rubber structure of a graft copolymer.

More specifically, one or more embodiments of the present invention relate to a resin composition including an acrylic resin and a graft copolymer, in which the graft copolymer includes the following inner layer and outer layer (hereinafter, also referred to as "resin composition according to one or more embodiments of the present invention):

inner layer: a soft polymer (B) having, as structural units, a monomer mixture (b) containing 40 to 99 wt % of an alkyl acrylate ester, 1 to 60 wt % of benzyl (meth)acrylate, and 0 to 40 wt % of another monomer having a double bond and copolymerizable with the alkyl acrylate ester and the benzyl (meth)acrylate and 0.1 to 5 parts by weight of a polyfunctional monomer (per 100 parts by weight of a total amount of the monomer mixture (b)); and outer layer a hard polymer (C) having, as structural units, a monomer mixture (c) containing 60 to 100 wt % of an alkyl methacrylate ester, 0 to 10 wt % of benzyl (meth)acrylate, and 40 to 0 wt % of another monomer having a double bond and copolymerizable with the alkyl methacrylate ester and the benzyl (meth)acrylate and 0 to 10 parts by weight of a polyfunctional monomer (per 100 parts by weight of a total amount of the monomer mixture (c)).

The graft copolymer preferably further includes the following innermost layer:

innermost layer: a hard polymer (A) having, as structural units, a monomer mixture (a) containing 60 to 99 wt % of an alkyl methacrylate ester, 0 to 35 wt % of an alkyl acrylate ester, and 0 to 40 wt % of another monomer having a double bond and copolymerizable with the alkyl methacrylate ester and the alkyl acrylate ester and 0.01 to 10 parts by weight of a polyfunctional monomer (per 100 parts by weight of a total amount of the monomer mixture (a)).

The monomer mixture (a) preferably contains 1 to 40 wt % of benzyl (meth)acrylate, 60 to 99 wt % of an alkyl methacrylate ester, 0 to 35 wt % of an alkyl acrylate ester, and 0 to 15 wt % of another monomer having a double bond and copolymerizable with the benzyl (meth)acrylate, the alkyl methacrylate ester, and the alkyl acrylate ester.

The monomer mixture (c) preferably contains 60 to 100 wt % of an alkyl methacrylate ester, 0 to 10 wt % of benzyl (meth)acrylate, 0 to 40 wt % of an alkyl acrylate ester, 0 to 40 wt % of an aromatic vinyl monomer, and 0 to 40 wt % of an unsaturated nitrile-based monomer.

A polymer obtained by performing up to polymerization for forming the inner layer of the graft copolymer preferably has an average particle diameter of 50 to 400 nm.

The acrylic resin preferably has a glass transition temperature of 115° C. or higher. The acrylic resin preferably contains at least one selected from the group consisting of a glutarimide acrylic resin, a maleimide acrylic resin, a partially-hydrogenated styrene unit-containing acrylic polymer an acrylic polymer having a cyclic acid anhydride structure, an acrylic polymer containing 97 to 100 wt % of methyl methacrylate and 3 to 0 wt % of methyl acrylate, and an acrylic polymer containing a hydroxyl group and/or a carboxyl group.

The resin composition according to one or more embodiments of the present invention preferably containing 40 to 98 parts by weight of the acrylic resin and 60 to 2 parts by weight of the graft copolymer (per 100 parts by weight of a total amount of the acrylic resin and the graft copolymer).

When the resin composition according to one or more embodiments of the present invention is molded to obtain a molded article having a thickness of 2 mm, the molded article preferably has a haze of 2% or less. When the resin composition according to one or more embodiments of the present invention is molded to obtain a molded article having a thickness of 2 mm, the molded article preferably has a YI value of 4 or less. When the resin composition according to one or more embodiments of the present invention is molded to obtain a molded article having a thickness of 2 mm, the molded article preferably has a maximum phase difference of 300 nm or less.

A molded article according to one or more embodiments of the present invention includes the resin composition according to one or more embodiments of the present invention. The molded article according to one or more embodiments of the present invention is preferably an injection molded article.

An acrylic resin film according to one or more embodiments of the present invention is obtained by molding the resin composition according to one or more embodiments of the present invention. The acrylic resin film according to one or more embodiments of the present invention preferably has an inner haze of 0.6% or less. The acrylic resin film according to one or more embodiments of the present invention preferably has an absolute value of a thickness-direction phase difference Rth of 3.5 nm or less. The acrylic resin film according to one or more embodiments of the present invention preferably has a thickness of 10 to 500 μm. The acrylic resin film according to one or more embodiments of the present invention may be a stretched film. The acrylic resin film according to one or more embodiments of the present invention may be an optical film.

An optical member according to one or more embodiments of the present invention includes the acrylic resin film according to one or more embodiments of the present invention.

A laminate according to one or more embodiments of the present invention includes a base material and the acrylic resin film according to one or more embodiments of the present invention laminated on the base material.

One or more embodiments of the present invention also relate to a method for producing a resin composition including an acrylic resin and a graft copolymer, in which the graft copolymer is obtained by multistage polymerization including the following polymerization stages (I) and (III):

(II) obtaining a soft polymer (B) by polymerizing a monomer mixture (b) containing 40 to 99 wt % of an alkyl acrylate ester, 1 to 60 wt % of benzyl (meth)acrylate, and 0 to 40 wt % of another monomer having a double bond and copolymerizable with the alkyl acrylate ester and the benzyl (meth)acrylate and 0.1 to 5 parts by weight of a polyfunctional monomer (per 100 parts by weight of a total amount of the monomer mixture (b)); and (III) obtaining a hard polymer (C) by polymerizing, in the presence of the soft polymer (B), a monomer mixture (c) containing 60 to 100 wt % of an alkyl methacrylate ester, 0 to 10 wt % of benzyl (meth)acrylate, and 40 to 0 wt % of another monomer having a double bond and copolymerizable with the alkyl methacrylate ester and the benzyl (meth)acrylate and 0 to 10 parts by weight of a polyfunctional monomer (per 100 parts by weight of a total amount of the monomer mixture (c)).

The multistage polymerization preferably further includes the following polymerization stage (I): (I) obtaining a hard polymer (A) by polymerizing a monomer mixture (a) containing 60 to 99 wt % of an alkyl methacrylate ester, 0 to 35 wt % of an alkyl acrylate ester, and 0 to 40 wt % of another monomer having a double bond and copolymerizable with the alkyl methacrylate ester and the alkyl acrylate ester and 0.01 to 10 parts by weight of a polyfunctional monomer (per 100 parts by weight of a total amount of the monomer mixture (a)).

The monomer mixture (a) preferably contains 1 to 40 wt % of benzyl (meth)acrylate, 60 to 99 wt % of an alkyl methacrylate ester, 0 to 35 wt % of an alkyl acrylate ester, and 0 to 15 wt % of another monomer having a double bond and copolymerizable with the benzyl (meth)acrylate, the alkyl methacrylate ester, and the alkyl acrylate ester.

One or more embodiments of the present invention further relate to an acrylic resin film containing an acrylic resin and a cross-linked structure polymer-containing graft copolymer, the acrylic resin film having a number of bending times of 200 or more as measured in accordance with a method specified in JIS C5016 under conditions of a measuring angle of 135°, a speed of 175 times-min. R=0.38, and a load of 200 g, an inner haze of 0.6% or less, an absolute value of a thickness-direction phase difference Rth of 4.0 nm or less, and a thickness of 10 to 500 μm.

A cross-linked structure polymer contained in the cross-linked structure polymer-containing graft copolymer preferably has an average particle diameter of 150 to 300 nm.

According to one or more embodiments of the present invention, it is possible to provide an acrylic resin composition that can provide a molded article or film that is excellent in mechanical properties such as impact resistance and bending resistance, transparency, and color and that is less likely to cause a phase difference, and a molded article and a film thereof.

BRIEF DESCRIPTION OF DRAWINGS

FIG. 1 is a photograph showing the result of a crossed Nicols test in Example 1.

FIG. 2 is a photograph showing the result of a crossed Nicols test in Example 2.

FIG. 3 is a photograph showing the result of a crossed Nicols test in Comparative Example 1.

FIG. 4 is a photograph showing the result of a crossed Nicols test in Comparative Example 2.

DETAILED DESCRIPTION OF EMBODIMENTS

Hereinbelow, one or more embodiments of the present invention will be described in detail. However, the present invention is not limited to these embodiments.

(Acrylic Resin)

An acrylic resin used in a resin composition according to one or more embodiments of the present invention is a resin containing, as a structural unit, a vinyl-based monomer including a (meth)acrylate ester, and may be a known acrylic resin. Particularly, the acrylic resin is preferably one containing a structural unit derived from a methacrylate ester, and is more preferably one containing 30 wt % or more, more preferably 50 wt % or more of an alkyl methacrylate ester unit whose alkyl group has 1 to 4 carbon atoms. From the viewpoint of thermal stability, the acrylic resin is even more preferably one containing, as structural units, 30 to 100 wt % of methyl methacrylate and 70 to 0 wt % of another vinyl-based monomer copolymerizable therewith.

The another vinyl-based monomer copolymerizable with methyl methacrylate is preferably, for example, a (meth) acrylate ester whose alkyl group has 1 to 10 carbon atoms (except for methyl methacrylate). Specific examples of the another vinyl-based monomer copolymerizable with methyl methacrylate include: methacrylate esters such as ethyl methacrylate, propyl methacrylate, butyl methacrylate, cyclohexyl methacrylate, 2-ethylhexyl methacrylate, benzyl methacylate, octyl methacrylate, glycidyl methacrylate, epoxycyclohexylmethyl methacrylate, dimethylaminoethyl methacrylate, 2-hydroxyethyl methacrylate, 2-hydroxypropyl methacrylate, dicyclopentanyl methacrylate, 2,2,2-trifluoroethyl methacrylate, 2,2,2-trichloroethyl methacrylate, isobornyl methacrylate, methacrylamide, and N-methylol methacrylamide; acrylate esters such as methyl acrylate ethyl acrylate, propyl acrylate, butyl acrylate, 2-ethylhexyl acrylate, octyl acrylate, glycidyl acrylate, epoxycyclohexylmethyl acrylate, 2-hydroxyethyl acrylate, 2-hydroxypropyl acrylate, acrylamide, and N-methylol acrylamide; carboxylic acids such as methacrylic acid and acrylic acid and salts thereof; vinyl cyanides such as acrylonitrile and methacrylonitrile; vinyl arenes such as styrene, α-methylstyrene, monochlorostyrene, and dichlorostyrene; maleimides such as N-phenylmaleimide, N-cyclohexylmaleimide, and N-methylmaleimide; maleic acid and fumaric acid and ester thereof: vinyl halides such as vinyl chloride, vinyl bromide, and chloroprene; vinyl esters such as vinyl formate, vinyl acetate, and vinyl propionate; alkenes such as ethylene, propylene, butylene, butadiene, and isobutylene; alkene halides; and polyfunctional monomers such as allyl methacrylate, diallyl phthalate, triallyl cyanurate, monoethylene glycol dimethacrylate, tetraethylene glycol dimethacrylate, tetraethylene glycol dimethacrylate, and divinyl benzene. These vinyl-based monomers may be used singly or in combination of two or more of them.

From the viewpoint of optical properties, appearance, weather resistance, and heat resistance, the amount of methyl methacrylate contained in the acrylic resin as a structural unit is preferably 30 to 100 wt %, more preferably 50 to 100 wt %, even more preferably 50 to 99.9 wt %, particularly preferably 50 to 98 wt %, and the amount of the another vinyl-based monomer copolymerizable with methyl methacrylate contained in the acrylic resin as a structural unit is preferably 70 to 0 wt %, more preferably 50 to 0 wt %, even more preferably 50 to 0.1 wt %, particularly preferably 50 to 2 wt %. It is to be noted that from the viewpoint of processability and appearance, it is preferred that the acrylic resin does not contain a polyfunctional monomer.

The glass transition temperature of the acrylic resin contained in the resin composition according to one or more embodiments of the present invention can be set in accordance with its use conditions and intended use. When the resin composition according to one or more embodiments of the present invention is used for purposes not requiring excellent heat resistance, the glass transition temperature may be lower than 115° C., but is preferably 90° C. or higher from the viewpoint of heat resistance during use. On the other hand, when the resin composition according to one or more embodiments of the present invention is used for purposes requiring heat resistance, the acrylic resin is preferably a highly heat-resistant one having a glass transition temperature of 115° C. or higher. The glass transition temperature of the acrylic resin is more preferably 118° C. or higher, even more preferably 120° C. or higher, most preferably 125° C. or higher.

The highly heat-resistant acrylic resin may be an acrylic resin having a cyclic structure in its main chain. Examples of the cyclic structure include a maleimide structure (including an N-substituted maleimide structure), a glutarimide structure, a glutaric anhydride structure, a maleic anhydride structure, and a lactone ring structure. Alternatively, the highly heat-resistant acrylic resin may be an acrylic resin containing a (meth)acrylic acid structural unit in its molecule. Specific examples of such an acrylic resin include a maleimide acrylic resin (acrylic resin copolymerized with a non-substituted or N-substituted maleimide compound as a copolymerization component), a glutarimide acrylic resin, a lactone ring-containing acrylic resin, an acrylic resin containing a hydroxyl group and/or a carboxyl group, a methacrylic resin, a partially hydrogenated styrene unit-containing acrylic polymer obtained by partially hydrogenating an aromatic ring of a styrene-containing acrylic polymer obtained by polymerization of a styrene monomer and another monomer copolymerizable therewith, and an acrylic polymer containing a cyclic acid anhydride structure such as a glutaric anhydride structure or a maleic anhydride structure. Among them, from the viewpoint of improving the heat resistance of a resulting acrylic resin film, a lactone ring-containing acrylic resin, a maleimide acrylic resin, a glutarimide acrylic resin, a glutaric anhydride structure-containing acrylic resin, a maleic anhydride structure-containing acrylic resin, and an acrylic polymer containing 97 to 100 wt % of methyl methacrylate and 3 to 0 wt % of methyl acrylate are preferred. Particularly, a glutarimide acrylic resin and a maleimide acrylic resin are preferred for their excellent optical properties. The above-mentioned acrylic resins may be used in combination of two or more of them. Particularly, when a glutarimide acrylic resin and a maleimide acrylic resin are used in combination, high transparency can be maintained and excellent optical properties can be achieved because these resins are highly mutually soluble. In addition, high thermal stability and solvent resistance can be achieved.

Further, the above-described acrylic resin may be used in combination with a highly heat-resistant resin other than the acrylic resin. From the viewpoint of excellent miscibility and achieving both high transparency and heat resistance, a glutarimide acrylic resin that is an acrylic resin and a maleic anhydride structure-containing resin that is a highly heat-resistant resin other than the acrylic resin are preferably used in combination.

An example of the maleimide acrylic resin includes one having a maleimide unit represented by the following general formula (5) and a (meth)acrylate ester unit:

[Chemical Formula 1]

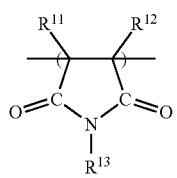

(5)

(wherein $R^{11}$ and $R^{12}$ are each independently a hydrogen atom, an alkyl group having 1 to 12 carbon atoms, or an aryl group having 6 to 14 carbon atoms, and $R^{13}$ is a hydrogen atom, an arylalkyl group having 7 to 14 carbon atoms, an aryl group having 6 to 14 carbon atoms, a cycloalkyl group having 3 to 12 carbon atoms, an alkyl group having 1 to 18 carbon atoms, or an aryl group having 6 to 14 carbon atoms or an alkyl group having 1 to 12 carbon atoms which has at least one substituent group selected from the following group A:

group A: halogen atom, hydroxyl group, nitro group, alkoxy group having 1 to 12 carbon atoms, alkyl group having 1 to 12 carbon atoms, and arylalkyl group having 7 to 14 carbon atoms).

Specific examples of the maleimide unit represented by the general formula (5) include a non-substituted maleimide unit, an N-methyl maleimide unit, an N-phenyl maleimide unit, an N-cyclohexyl maleimide unit, and an N-benzyl maleimide unit. These maleimide units may be contained singly or in combination of two or more of them.

For the purpose of adjusting optical properties, the maleimide acrylic resin preferably further has an aromatic vinyl unit.

The glutarimide acrylic resin is an acrylic resin having a glutarimide structure. An example of the glutarimide acrylic resin includes a resin having a unit represented by the following general formula (1) and a unit represented by the following general formula (2).

[Chemical Formula 2]

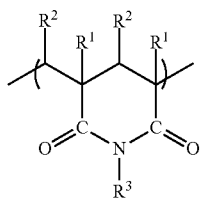

(1)

In the above general formula (1), $R^1$ and $R^2$ are each independently hydrogen or an alkyl group having 1 to 8 carbon atoms, and $R^3$ is hydrogen, an alkyl group having 1 to 18 carbon atoms, a cycloalkyl group having 3 to 12 carbon atoms, or a substituent group having an aromatic ring and 5 to 15 carbon atoms. Hereinafter, the unit represented by the above general formula (1) is also referred to as "glutarimide unit".

In the above general formula (1), $R^1$ and $R^2$ are preferably each independently hydrogen or a methyl group, $R^3$ is preferably hydrogen, a methyl group, a butyl group, or a cyclohexyl group, and $R^1$, $R^2$, and $R^3$ are more preferably a methyl group, hydrogen, and a methyl group, respectively.

The glutarimide acrylic resin may contain only one kind of glutarimide unit or may contain two or more kinds of glutarimide units among which any one of $R^1$, $R^2$, and $R^3$ in the above general formula (1) is different or all of them are different.

The glutarimide unit can be formed by imidizing a (meth)acrylate ester unit represented by the following general formula (2). Alternatively, the glutarimide unit may be formed by imidizing an acid anhydride such as maleic anhydride, a half ester obtained from the acid anhydride and a linear or branched alcohol having 1 to 20 carbon atoms, or α,β-ethylenic unsaturated carboxylic acid (e.g., acrylic acid, methacrylic acid, maleic acid, itaconic acid, crotonic acid, fumaric acid, or citraconic acid).

The glutarimide unit content of the glutarimide acrylic resin is not particularly limited, and can be appropriately determined in consideration of, for example, the structure of $R^3$. However, the glutarimide unit content is preferably 1.0 wt % or more, more preferably 3.0 wt % to 90 wt %, even more preferably 5.0 wt % to 60 wt % with respect to the total weight of the glutarimide acrylic resin. If the glutarimide unit content is less than the above lower limit, the resulting glutarimide acrylic resin tends to be poor in heat resistance or tends to have impaired transparency. On the other hand, if the glutarimide unit content exceeds the above upper limit, heat resistance and melt viscosity become unnecessarily high, which tends to deteriorate mold-workability, significantly decrease mechanical strength when a resulting film is processed, or impair transparency.

The glutarimide unit content is calculated in the following manner.

A resin is subjected to $^1$H-NMR analysis using $^1$H-NMR BRUKER AvanceIII (400 MHz) to determine the amount of each monomer unit, such as a glutarimide unit or an ester unit, contained in the resin (mol %), and the monomer unit content (mol %) is converted to a monomer unit content (wt % using the molecular weight of each monomer unit.

For example, when the resin is composed of a glutarimide unit whose $R^3$ in the above general formula (1) is a methyl group and a methyl methacrylate unit, the glutarimide unit content (wt %) of the resin can be determined from the following calculation formula using the area a of a peak derived from protons of O—$CH_3$ of methyl methacrylate and appearing at around 3.5 to 3.8 ppm and the area b of a peak derived from protons of N—$CH_3$ of glutarimide and appearing at around 3.0 to 3.3 ppm.

[Methyl methacylate unit content $A$ (mol %)]=100× $a/(a+b)$

[Glutarimide unit content $B$ (mol %)]=100×$b/(a+b)$

[Glutarimide unit content (wt %)]=100×($b$×(molecular weight of glutarimide unit))/($a$×(molecular weight of methyl methacrylate unit)+$b$×(molecular weight of glutarimide unit))

It is to be noted that even when the resin contains a monomer unit other than the above units, the glutarimide unit content (wt %) can be determined in the same manner as described above from the amount of each monomer unit contained in the resin (mol %) and the molecular weight of each monomer unit.

When an acrylic resin film according to one or more embodiments of the present invention is intended to be used as, for example, a polarizer protective film, the glutarimide unit content is preferably 20 wt % or less, more preferably 15 wt % or less, even more preferably 10 wt % or less because birefringence is likely to be suppressed.

[Chemical Formula 3]

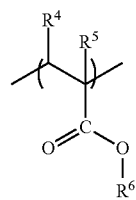

(2)

In the above general formula (2), $R^4$ and $R^5$ are each independently hydrogen or an alkyl group having 1 to 8 carbon atoms, and $R^6$ is an alkyl group having 1 to 18 carbon atoms, a cycloalkyl group having 3 to 12 carbon atoms, or a substituent group having an aromatic ring and 5 to 15 carbon atoms. Hereinafter, the unit represented by the above general formula (2) is also referred to as "(meth)acrylate ester unit". In one or more embodiments of the present invention. "(meth)acrylic" means "methacrylic or acrylic".

In the above general formula (2). $R^4$ and $R^5$ are preferably each independently hydrogen or a methyl group, $R^6$ is preferably hydrogen or a methyl group, and $R^4$, $R^5$, and $R^6$ are more preferably hydrogen, a methyl group, and a methyl group, respectively.

The glutarimide acrylic resin may contain only one kind of (meth)acylate ester unit or may contain two or more kinds of (meth)acrylate ester units among which any one of $R^4$, $R^5$, and $R^6$ in the above general formula (2) is different or all of them are different.

If necessary, the glutarimide acrylic resin may further contain a unit represented by the following general formula (3) (hereinafter, also referred to as "aromatic vinyl unit").

[Chemical Formula 4]

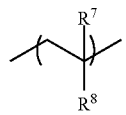

(3)

In the above general formula (3). $R^7$ is hydrogen or an alkyl group having 1 to 8 carbon atoms, and $R^5$ is an aryl group having 6 to 10 carbon atoms.

The aromatic vinyl unit represented by the above general formula (3) is not particularly limited, and examples thereof include a styrene unit and an α-methylstyrene unit. The aromatic vinyl unit is preferably a styrene unit.

The glutarimide acrylic resin may contain only one kind of aromatic vinyl unit and may contain two or more aromatic vinyl units between which one of $R^7$ and $R^8$ is different or both of them are different.

The aromatic vinyl unit content of the glutarimide acrylic resin is not particularly limited, but is preferably 0 to 50 wt %, more preferably 0 to 20 wt %, particularly preferably 0 to 15 wt % with respect to the total weight of the glutarimide acrylic resin. If the aromatic vinyl unit content exceeds the above upper limit, the glutarimide acrylic resin cannot have sufficient heat resistance.

However, there is a case where the glutarimide acrylic resin preferably contains no aromatic vinyl unit from the viewpoint of improving bending resistance and transparency, reducing fish-eyes, and improving solvent resistance or weather resistance.

If necessary, the glutarimide acrylic resin may further contain another unit other than the glutarimide unit, the (meth)acrylate ester unit, and the aromatic vinyl unit.

Examples of the another unit include amide-based units such as acrylamide and methacrylamide, a glutaric anhydride unit, and nitrile-based units such as acrylonitrile and methacrylonitrile.

The another unit may be incorporated into the glutarimide acrylic resin by random copolymerization or graft copolymerization.

The another unit may be incorporated into the glutarimide acrylic resin by copolymerization of a monomer constituting the another unit and the glutarimide acrylic resin and/or a resin used as a raw material for producing the glutarimide acrylic resin. The another unit incorporated into the glutarimide acrylic resin may be a by-product of the above-described imidization reaction.

The weight-average molecular weight of the glutarimide acrylic resin is not particularly limited, but is preferably in the range of $1\times10^4$ to $5\times10^5$. By setting the weight-average molecular weight of the glutarimide acrylic resin to a value within the above range, it is possible to prevent deterioration in mold-workability or to prevent a resulting film from having poor mechanical strength when the film is processed. On the other hand, if the weight-average molecular weight is less than the above lower limit, a resulting film tends to have poor mechanical strength. If the weight-average molecular weight exceeds the above upper limit, viscosity during melt extrusion tends to be high, mold-workability tends to be deteriorated, and molded article productivity tends to be declined.

The glass transition temperature of the glutarimide acrylic resin is preferably 117° C. or higher so that a resulting film can have excellent heat resistance. The glass transition temperature is more preferably 120° C. or higher, even more preferably 125° C. or higher.

Hereinbelow one example of a method for producing a glutarimide acrylic resin will be described.

First, a (meth)acrylate ester polymer is produced by polymerization of a (meth)acrylate ester. When a glutarimide acrylic resin containing an aromatic vinyl unit is to be produced, a (meth)acrylate ester-aromatic vinyl copolymer is produced by copolymerization of a (meth)acrylate ester and an aromatic vinyl compound.

The (meth)acrylate ester used in this step is preferably, for example, methyl (meth)acrylate, ethyl (meth)acrylate, butyl (meth)acrylate, isobutyl (meth)acrylate, t-butyl (meth)acrylate, benzyl (meth)acrylate, or cyclohexyl (meth)acrylate, and is more preferably methyl methacrylate.

These (meth)acrylate esters may be used singly or in combination of two or more of them. The use of two or more kinds of (meth)acrylate esters makes it possible to finally obtain a glutarimide acrylic resin containing two or more kinds of (meth)acrylate ester units.

The structure of the (meth)acrylate ester polymer or the (meth)acrylate ester-aromatic vinyl copolymer is not particularly limited as long as a subsequent imidization reaction can be carried out. More specifically, the (meth)acrylate ester polymer or the (meth)acrylate ester-aromatic vinyl copolymer may be a linear polymer, a block polymer, a branched polymer, a ladder polymer, a cross-linked polymer, or the like.

In the case of a block polymer, the block polymer may be any one of an A-B-type block polymer, an A-B-C-type block polymer, an A-B-A-type block polymer, and another type of block polymer.

The (meth)acylate ester polymer or the (meth)acrylate ester-aromatic vinyl copolymer is reacted with an imidization agent to carry out an imidization reaction. In this way, a glutarimide acrylic resin can be produced.

The imidization agent is not particularly limited as long as the glutarimide unit represented by the above general formula (1) can be produced. More specifically, ammonia or a primary amine can be used. Examples of the primary amine include: aliphatic hydrocarbon group-containing primary amines such as methylamine, ethylamine, n-propylamine, i-propylamine, n-butylamine, i-butylamine, tert-butylamine, and n-hexylamine; aromatic hydrocarbon group-containing primary amines such as aniline, benzylamine, toluidine, and trichloroaniline; and alicyclic hydrocarbon group-containing primary amines such as cyclohexylamine.

The imidization agent may be a urea-based compound that generates ammonia or a primary amine by heating, and examples of such a compound include urea, 1,3-dimethylurea, 1,3-diethylurea and 1,3-dipropylurea.

Among these imidization agents, ammonia, methylamine, and cyclohexylamine are preferably used, and methylamine is particularly preferably used from the viewpoint of cost and physical properties.

In the imidization step, a ring-closing promoter may be added in addition to the imidization agent, if necessary.

In the imidization step, the glutarimide unit content of a resulting glutarimide acrylic resin can be adjusted by adjusting the ratio of the imidization agent added.

A method for carrying out the imidization reaction is not particularly limited, and a conventionally-known method can be used. For example, the imidization reaction is allowed to proceed by using an extruder or a batch-type reactor (pressure vessel).

The extruder is not particularly limited, and various extruders, such as a single screw extruder, a twin screw extruder, and a multi-screw extruder, can be used.

Among them, a twin screw extruder is preferably used. The use of a twin screw extruder makes it possible to promote mixing of the raw material polymer and the imidization agent (or, when a ring-closing promoter is used, mixing of the raw material polymer, the imidization agent, and the cyclization promoter).

Examples of the twin screw extruder include a non-intermeshing co-rotating twin screw extruder, an intermeshing co-rotating twin screw extruder, a non-intermeshing counter-rotating twin screw extruder, and an intermeshing counter-rotating twin screw extruder. Among them, an intermeshing co-rotating twin screw extruder is preferred. The screws of an intermeshing co-rotating twin screw extruder can rotate at high speed, and therefore mixing of the raw material polymer and the imidization agent (or, when a ring-closing promoter is used, mixing of the raw material polymer, the imidization agent, and the ring-closing promoter) can be further promoted. The above-mentioned extruders may be used singly or in combination of two or more of them connected in series.

The glutarimide acrylic resin production method may include, in addition to the above-described imidization step, an esterification step in which treatment using an esterification agent is performed. The esterification step makes it possible to convert carboxyl groups contained in the resin as a by-product of the imidization step to ester groups. This makes it possible to adjust the acid value of the glutarimide acrylic resin to a value within a desired range.

The acid value of the glutarimide acrylic resin is not particularly limited, but is preferably 0.50 mmol/g or less, more preferably 0.45 mmol/g or less. The lower limit of the acid value is not particularly limited, but is preferably 0 mmol/g or more, more preferably 0.05 mmol/g or more, particularly preferably 0.10 mmol/g or more. By setting the acid value to a value within the above range, the glutarimide acrylic resin can offer an excellent balance of heat resistance, mechanical properties, and mold-workability. On the other hand, if the acid value exceeds the above upper limit, foaming of the resin is likely to occur during melt extrusion for film formation, which tends to deteriorate mold-workability and to decline molded article productivity. It is to be noted that the acid value can be calculated by, for example, a titration method described in JP-A-2005-23272.

The esterification agent is not particularly limited, and examples thereof include dimethyl carbonate, 2,2-dimethoxypropane, dimethylsulfoxide, triethyl orthoformate, trimethyl orthoacetate, trimethyl orthoformate, diphenyl carbonate, dimethyl sulfate, methyl toluenesulfonate, methyl trifluoromethylsulfonate, methyl acetate, methanol, ethanol, methyl isocyanate, p-chlorophenyl isocyanate, dimethylcarbodiimide, dimethyl-butylsilylchloride, isopropenyl acetate, dimethylurea, tetramethylammonium hydroxide, dimethyl diethoxysilane, tetra-N-butoxysilane, dimethyl(trimethylsilane) phosphite, trimethyl phosphite, trimethyl phosphate, tricresyl phosphate, diazomethane, ethylene oxide, propylene oxide, cyclohexene oxide, 2-ethylhexylglycidyl ether, phenyl glycidyl ether, and benzyl glycidyl ether. Among them, dimethyl carbonate and trimethyl orthoacetate are preferred from the viewpoint of cost, reactivity, and the like, and dimethyl carbonate is particularly preferred from the viewpoint of cost.

The amount of the esterification agent used is not particularly limited, but is preferably 0 to 12 parts by weight, more preferably 0 to 8 parts by weight per 100 parts by weight of the (meth)acrylate ester polymer or the (meth)acrylate ester-aromatic vinyl copolymer. By setting the amount of the esterification agent used to a value within the above range, the acid value of the glutarimide acrylic resin can be adjusted to a value within an appropriate range. On the other hand, if the amount of the esterification agent used falls outside the above range, there is a possibility that part of the esterification agent will remain unreacted in the resin, in which case the unreacted esterification agent will become a cause of foaming or odor generation when molding is performed using the resin.

A catalyst may be used in combination with the esterification agent. The type of catalyst to be used is not particularly limited, and examples of the catalyst include aliphatic tertiary amines such as trimethylamine, triethylamine, and tributylamine. Among them, triethylamine is preferred from the viewpoint of cost, reactivity, and the like.

As in the case of the imidization step, the esterification step is allowed to proceed by using, for example, an extruder or a batch-type reactor.

The esterification step may be performed only by heat treatment without using the esterification agent. The heat treatment can be achieved by kneading and dispersing the melted resin in an extruder. When the esterification step is performed only by heat treatment, some or all of the carboxyl groups produced as a by-product in the imidization step can be converted to acid anhydride groups by, for example, a dehydration reaction between carboxyl groups in the resin and/or a dealcoholization reaction between a carboxyl group in the resin and an alkyl ester group in the resin. At this time, a ring-closing promoter (catalyst) may be used.

Even when the esterification step is performed using the esterification agent, conversion to acid anhydride groups by heat treatment can be allowed to proceed in parallel.

In both the imidization step and the esterification step, an extruder used is preferably equipped with a vent port so that the pressure in the extruder can be reduced to atmospheric pressure or less. The use of such a machine makes it possible to remove the unreacted part of the imidization agent, the unreacted part of the esterification agent, a by-product such as methanol, or monomers.

The glutarimide acrylic resin can also be appropriately produced using, instead of an extruder, a high-viscosity reaction apparatus such as a horizontal twin screw reaction apparatus such as BIVOLAK manufactured by Sumitomo Heavy Industries, Ltd. or a vertical twin screw mixing vessel such as SUPER BLEND.

When the glutarimide acrylic resin is produced using a batch-type reactor (pressure vessel), the structure of the batch-type reactor (pressure vessel) is not particularly limited. More specifically, the batch-type reactor should have a structure in which the raw material polymer can be melted by heating and stirred and the imidization agent (or, when a ring-closing promoter is used, the imidization agent and the ring-closing promoter) can be added, and preferably has a structure excellent in stirring efficiency. The use of such a batch-type reactor can prevent insufficient stirring due to an increase in the viscosity of the polymer with the progress of the reaction. Examples of a batch-type reactor having such a structure include a mixing vessel MAX BLEND manufactured by Sumitomo Heavy Industries, Ltd, and the like.

(Graft Copolymer)

A graft copolymer used in one or more embodiments of the present invention can impart excellent transparency and color to a molded article or film obtained by molding the resin composition according to one or more embodiments of the present invention, and further can improve the mechanical strength, such as impact strength and bending resistance, of the molded article or the film and reduce the phase difference of the molded article or the film.

In one or more embodiments of the present invention, preferred examples of the graft copolymer include a multistage-polymerized polymer and a multilayer structure polymer (which is a so-called core-shell type polymer). The multistage-polymerized polymer is a polymer obtained by polymerizing a monomer mixture in the presence of polymer particles, and the multilayer structure polymer is a polymer (core-shell type polymer) having a polymer layer obtained by polymerizing a monomer mixture in the presence of polymer particles. Both the polymers basically refer to the same polymer, but the former is a polymer defined mainly on the basis of its production method, and the latter is a polymer defined mainly on the basis of its layer structure. The former will be mainly described below, but the same applies to the latter.

The graft copolymer used in one or more embodiments of the present invention is a multilayer structure polymer having at least an inner layer and an outer layer, and can be obtained by multistage polymerization including the following polymerization stages (II) and (III):

(II) obtaining a soft polymer (B) by polymerizing a monomer mixture (b) containing 40 to 99 wt % of an alkyl acrylate ester, 1 to 60 wt % of benzyl (meth)acrylate, and 0 to 40 wt % of another monomer having a double bond and copolymerizable with the alkyl acrylate ester and the benzyl (meth)acrylate and 0.1 to 5 parts by weight of a polyfunctional monomer (per 100 parts by weight of a total amount of the monomer mixture (b)); and (III) obtaining a hard polymer (C) by polymerizing, in the presence of the soft polymer (B), a monomer mixture (c) containing 60 to 100 wt % of an alkyl methacrylate ester, 0 to 10 wt % of benzyl (meth)acrylate, and 40 to 0 wt % of another monomer having a double bond and copolymerizable with the alkyl methacrylate ester and the benzyl (meth) acrylate and 0 to 10 parts by weight of a polyfunctional monomer (per 100 parts by weight of a total amount of the monomer mixture (c)).

According to a preferred embodiment of the graft copolymer used in one or more embodiments of the present invention, the multistage polymerization includes the following polymerization stage (I) before the polymerization stage (II). That is, the graft copolymer according to the preferred embodiment is a multilayer structure polymer having an innermost layer, an inner layer, and an outer layer, and can be obtained by multistage polymerization including the following polymerization stages (I) to (III):

(I) polymerizing a monomer mixture (a) containing 60 to 99 wt % of an alkyl methacrylate ester, 0 to 35 wt % of an alkyl acrylate ester, and 0 to 40 wt % of another monomer copolymerizable with the alkyl methacrylate ester and the alkyl acrylate ester and having a double bond and 0.01 to 10 parts by weight of a polyfunctional monomer (per 100 parts by weight of the total amount of the monomer mixture (a)) to obtain a hard polymer (A);

(II) polymerizing, in the presence of the hard polymer (A), a monomer mixture (b) containing 40 to 99 wt % of an alkyl acrylate ester, 1 to 60 wt % of benzyl (meth)acrylate, and 0 to 40 wt % of another monomer copolymerizable with the alkyl acrylate ester and the benzyl (meth)acylate and having a double bond and 0.1 to 5 parts by weight of a polyfunctional monomer (per 100 parts by weight of the total amount of the monomer mixture (b)) to obtain a soft polymer (B); and (III) obtaining a hard polymer (C) by polymerizing, in the presence of the soft polymer (B), a monomer mixture (c) containing 60 to 100 wt % of an alkyl methacrylate ester, 0 to 10 wt % of benzyl (meth)acrylate, and 40 to 0 wt % of another monomer having a double bond and copolymerizable with the alkyl methacylate ester and the benzyl (meth) acylate and 0 to 10 parts by weight of a polyfunctional monomer (per 100 parts by weight of a total amount of the monomer mixture (c)). Such an embodiment using a multilayer structure polymer having an innermost layer, an inner layer, and an outer layer is preferred because transparency and color are well-balanced and excellent color is achieved.

The polymerization stages (I)-(III) will be described below in order, but the polymerization stage (I) is an optional stage. Therefore, a graft copolymer obtained without performing the polymerization stage (I) is also within the scope of the present invention as long as the polymerization stages (II) and (III) are performed.

Polymerization Stage (I)

The innermost layer of the graft copolymer used in one or more embodiments of the present invention is formed by obtaining a hard polymer (A) by polymerizing a monomer mixture (a) containing 60 to 99 wt % of an alkyl methacrylate ester, 0 to 35 wt % of an alkyl acrylate ester, and 0 to 40 wt % of another monomer copolymerizable with the alkyl methacrylate ester and the alkyl acrylate ester and having a double bond and 0.01 to 10 parts by weight of a polyfunctional monomer (per 100 parts by weight of the total amount of the monomer mixture (a)).

The monomer mixture (a) preferably contains benzyl (meth)acrylate. More specifically, the innermost layer is preferably formed by obtaining a hard polymer (A) by polymerizing a monomer mixture (a) containing 1 to 40 wt % of benzyl (meth)acrylate, 60 to 99 wt % of an alkyl methacrylate ester, 0 to 35 wt % of an alkyl acrylate ester, and 0 to 15 wt % of another monomer copolymerizable with the benzyl (meth)acrylate, the alkyl methacrylate ester, and the alkyl acrylate ester and having a double bond and 0.01 to 10 parts by weight of a polyfunctional monomer (per 100 parts by weight of the total amount of the monomer mixture (a)).

The monomer mixture (a) preferably contains 1 to 40 wt % of benzyl (meth)acrylate, 6) to 99 wt % of an alkyl methacrylate ester, 0 to 35 wt % of an alkyl acrylate ester, 0 to 5 wt % of an aromatic vinyl monomer, and 0 to 10 wt % of another copolymerizable monomer having a double bond, more preferably contains 1 to 40 wt % of benzyl (meth)acrylate, 60 to 99 wt % of an alkyl methacrylate ester, 0 to 35 wt % of an alkyl acrylate ester, 0 to 3 wt % of an aromatic vinyl monomer, and 0 to 10 wt % of another copolymerizable monomer having a double bond, even more preferably contains 1 to 40 wt % of benzyl (meth)acrylate, 60 to 99 wt % of an alkyl methacrylate ester, 0 to 35 wt % of an alkyl acrylate ester, 0 to 1 wt % of an aromatic vinyl monomer, and 0 to 10 wt % of another copolymerizable monomer having a double bond, and most preferably contains 1 to 40 wt of benzyl (meth)acrylate, 60 to 99 wt % of an alkyl methacrylate ester, 0 to 35 wt % of an alkyl acrylate ester, and 0 to 10 wt % of another copolymerizable monomer having a double bond other than an aromatic vinyl monomer. By setting the amount of each of the monomers in the monomer mixture (a) to a value within the above range, the graft copolymer used in one or more embodiments of the present invention can have high thermal stability and can withstand high-temperature molding. The alkyl acrylate ester content of the monomer mixture (a) is preferably 5 to 35 wt %. The alkyl methacylate ester as a main component is likely to be thermally decomposed during high-temperature molding due to zipping depolymerization, but by setting the alkyl acrylate ester content to a value within the above range, such zipping depolymerization can be easily prevented and thermal stability can be improved. Further, the aromatic vinyl monomer content of the monomer mixture (a) within the above range is effective at reducing the phase difference of a molded article. Particularly, it is preferred that the aromatic vinyl monomer is not used. The reason for this will be described later.

If the alkyl methacrylate ester content of the monomer mixture (a) is less than 60 wt %, the excellent characteristics of the acrylic resin, that is, excellent transparency and color are not developed.

Further, from the viewpoint of mechanical properties, transparency, color, and reduction in phase difference, the alkyl methacrylate ester content of the monomer mixture (a) is preferably 60 to 97 wt %, more preferably 60 to 95 wt %. From the viewpoint of mechanical properties, transparency, color, and reduction in phase difference, the benzyl (meth) acrylate content of the monomer mixture (a) is preferably 3 to 40 wt %, more preferably 5 to 38 wt %, even more preferably 8 to 36 wt %, most preferably 10 to 35 wt %.

Examples of the alkyl methacrylate ester include methyl methacrylate, ethyl methacrylate, n-butyl methacrylate, isobutyl methacrylate, t-butyl methacrylate, hexyl methacrylate, cyclohexyl methacrylate, 2-ethylhexyl methacrylate, and octyl methacrylate. Preferably, the methacrylate ester is an alkyl methacrylate ester whose alkyl group has 1 to 4 carbon atoms, and examples of such an alkyl methacrylate ester include methyl methacrylate, ethyl methacrylate, n-butyl methacrylate, isobutyl methacrylate, and t-butyl methacrylate. These methacrylate esters may be used singly or in combination of two or more of them. However, methyl methacrylate is particularly preferred.

Examples of the alkyl acrylate ester include methyl acrylate, ethyl acrylate, n-butyl acrylate, isobutyl acrylate, t-butyl acrylate, hexyl acrylate, cyclohexyl acrylate, 2-ethylhexyl acrylate, and octyl acrylate. The alkyl acrylate ester is preferably one whose alkyl group has 1 to 12 carbon atoms. Examples of the alkyl acrylate ester whose alkyl group has 1 to 12 carbon atoms include ethyl acrylate, n-butyl acrylate, n-octyl acrylate, 2-ethylhexyl acrylate, and cyclohexyl acrylate. These alkyl acrylate esters may be used singly or in combination of two or more of them.

The another copolymerizable monomer having a double bond is preferably at least one selected from the group consisting of a (meth)acrylate ester, an aromatic vinyl monomer, and another copolymerizable monomer having a double bond (hereinafter also referred to as "another copolymerizable monomer"). The (meth)acrylate ester is not particularly limited as long as it is other than the alkyl (meth)acrylate ester and the benzyl (meth)acrylate, and examples thereof include isobornyl acrylate and phenyl acrylate. Examples of the aromatic vinyl monomer include styrene, α-methylstyrene, chlorostyrene, and other styrene derivatives. Examples of the another copolymerizable monomer include: an unsaturated nitrile-based monomer such as acrylonitrile or methacrylonitrile; an α,β-unsaturated carboxylic acid such as acrylic acid, methacrylic acid, or crotonic acid, vinyl acetate; an olefin-based monomer such as ethylene or propylene; a vinyl halide-based monomer such as vinyl chloride, vinylidene chloride, or vinylidene fluoride, and a maleimide-based monomer such as N-ethyl maleimide, N-propyl maleimide, N-cyclohexyl maleimide, N-o-chlorophenyl maleimide. These copolymerizable monomers may be used singly or in combination of two or more of them.

Further, by setting the amount of each of the monomers contained in the monomer mixture (a) to a value within the above range, it is possible to reduce the phase difference of a molded article or film containing the graft copolymer used in one or more embodiments of the present invention. The concept of such a reduction in phase difference is as follows.

In order to allow a molded article or film containing the graft copolymer used in one or more embodiments of the present invention to have excellent transparency and color, it is important to match the refractive index of the acrylic resin as a matrix to the refractive index of the graft copolymer, especially the refractive index of each the hard polymer (A) obtained in the polymerization stage (I) and the soft polymer (B) obtained in the polymerization stage (II). When the optional polymerization stage (I) is performed by copolymerizing an alkyl methacrylate ester as a main monomer of the monomer mixture (a) (e.g., the refractive index of a methyl methacrylate homopolymer is 1.49) with an alkyl acrylate ester (e.g., the refractive index of a butyl acrylate homopolymer is 1.4631), a refractive index of the resulting copolymer becomes low, and therefore it is difficult to match the refractive index of the copolymer to the refractive index of the acrylic resin as a matrix. Therefore, a styrene monomer (whose homopolymer has a refractive index of 1.591) that can provide a high refractive polymer is conventionally copolymerized with an alkyl methacrylate ester to match the refractive index of the hard polymer (A) to the refractive index of the acrylic resin as a matrix. It is to be noted that the refractive index of a copolymer can be calculated as the weighted average of the refractive indexes of homopolymers of monomers (i.e., determined by summing refractive indexes each determined by multiplying the refractive index of a homopolymer of each monomer by the weight fraction of the monomer in the copolymer). As the refractive index of each homopolymer, a value described in Polymer Hand Book (J. Brandrup, Interscience 1989) can be used.

However, phase difference may occur. The intrinsic birefringences of some homopolymers will be shown later. Polystyrene that is a styrene polymer has a very large absolute value of intrinsic birefringence. As described above, styrene is conventionally often used to match the refractive index of a graft copolymer, especially a cross-linked polymer layer to the refractive index of a matrix. However, when a molded article containing such a graft copolymer is obtained by, for example, injection molding or a stretched film containing such a graft copolymer is obtained, it is difficult to reduce the phase difference of the near-gate area of the injection molded article or of a portion of the stretched film in which polymer chains are oriented. Therefore, it is preferred that a monomer whose homopolymer has a refractive index as high as that of polystyrene and a small absolute value of intrinsic birefringence, such as benzyl (meth)acrylate (e.g., the refractive index of poly(benzyl methacrylate) is 1.568), is used instead of a monomer having a large absolute value of intrinsic birefringence such as styrene. Particularly, methyl methacrylate that is a main monomer of the monomer mixture (a) has a negative intrinsic birefringence, and therefore benzyl (meth)acrylate having a positive intrinsic birefringence is particularly preferably used. Further, the inner layer of the graft copolymer used in one or more embodiments of the present invention is easily deformed by, for example, film stretching. Therefore, from the viewpoint of reducing the phase difference of the inner layer, the monomer mixture (b) constituting the inner layer preferably contains benzyl (meth)acrylate having a small absolute value of intrinsic birefringence.

Polymers Showing Positive Intrinsic Birefringence:
Polybenzyl methacrylate [+0.002]
Polyphenylene oxide [+0.210]
Bisphenol A polycarbonate [+0.106]
Polyvinyl chloride [+0.027]
Polyethylene terephthalate [+0.105]
Polyethylene [+0.044]

Polymers Showing Negative Intrinsic Birefringence:
Polymethyl methacrylate [−0.0043]
Polystyrene [−0.100]

An aromatic vinyl monomer may be used as the another copolymerizable monomer having a double bond without impairing the advantageous effects of one or more embodiments of the present invention, but from the above viewpoint, the amount of the aromatic vinyl monomer used is preferably within the above range. More preferably, the monomer mixture (a) contains no aromatic vinyl monomer, and most preferably, the another copolymerizable monomer having a double bond is not used. That is, the monomer mixture (a) most preferably contains 1 to 40 wt % of benzyl (meth)acrylate, 60 to 99 wt % of an alkyl methacrylate ester, and 0 to 35 wt % of an alkyl acrylate ester without containing other monomers.

The amount of the polyfunctional monomer used in the polymerization stage (I) is 0.01 to 10 parts by weight, preferably 0.01 to 7 parts by weight, more preferably 0.01 to 5 parts by weight, most preferably 0.01 to 2 parts by weight per 100 parts by weight of the total amount of the monomer mixture (a). If the amount of the polyfunctional monomer used is less than 0.01 parts by weight, a resulting molded article or film has low transparency or impaired color, and if the amount of the polyfunctional monomer used exceeds 10 parts by weight, the effect of improving mechanical properties is reduced.

The polyfunctional monomer to be used may be either one known as a cross-linking agent or one known as a cross-linkable monomer. Preferred examples of the cross-linkable monomer include allyl methacrylate, allyl acrylate, diallyl maleate, diallyl fumarate, diallyl itaconate, monoallyl maleate, monoallyl fumarate, butadiene, and divinyl benzene. These cross-linkable monomers may be used singly or in combination of two or more of them. More preferably, allyl methacrylate is used singly, or allyl methacrylate and another polyfunctional monomer are used in combination.

The polymerization stage (I) is preferably performed in the presence of a chain transfer agent. The chain transfer agent is not particularly limited. However, a mixture of the monomer mixture (a) and the polyfunctional monomer is preferably polymerized in the presence of a primary alkyl mercaptan-based chain transfer agent and/or a secondary alkyl mercaptan-based chain transfer agent to obtain a hard polymer (A).

The amount of the primary alkyl mercaptan-based chain transfer agent and/or the secondary alkyl mercaptan-based chain transfer agent used in the polymerization stage (I) is preferably 0.01 to 6.0 parts by weight per 100 parts by weight of the monomer mixture (a). The lower limit is more preferably 0.03 parts by weight, even more preferably 0.1 parts by weight, still even more preferably 0.24 parts by weight, yet even more preferably 0.26 parts by weight, particularly preferably 0.3 parts by weight. The upper limit is more preferably 3 parts by weight, even more preferably 1.6 parts by weight. It is generally known that when a sulfur content is higher, higher thermal stability is achieved. Further, a chain transfer agent is generally used to adjust the molecular weight of a polymer. When the amount of a chain transfer agent used is increased, the amount of a free polymer having a low molecular weight is increased. Therefore, when a chain transfer agent is used in a larger amount, the graft copolymer obtained by polymerization imparts superior fluidity to a mixture of the graft copolymer and the acrylic resin when the mixture is molded. On the other hand, if a chain transfer agent is excessively used, there is a case where a resulting molded article is less likely to have adequate impact resistance, or a resulting acrylic resin film is less likely to have adequate mechanical properties such as bending resistance, cracking resistance during slitting, and cracking resistance during punching. However, by setting the amount of the primary alkyl mercaptan-based chain transfer agent and/or the secondary alkyl mercaptan-based chain transfer agent used to a value within the above range, it is possible to obtain a graft copolymer that offers an excellent balance of impact resistance, thermal stability, and fluidity during molding. If the amount of the chain transfer agent used exceeds 6.0 parts by weight, the effect of improving mechanical properties tends to decline.

The primary alkyl mercaptan-based chain transfer agent and/or the secondary alkyl mercaptan-based chain transfer agent to be used may be a generally-known chain transfer agent. Specific examples of the chain transfer agent include a primary alkyl mercaptan-based chain transfer agent such as n-butyl mercaptan, n-octyl mercaptan, n-hexadecyl mercaptan, n-dodecyl mercaptan, or n-tetradecyl mercaptan and a secondary alkyl mercaptan-based chain transfer agent such as s-butyl mercaptan or s-dodecyl mercaptan. These may be used singly or in combination of two or more of them.

The chain transfer agent used in the polymerization stage (I) is preferably a primary alkyl mercaptan-based chain transfer agent, more preferably n-octyl mercaptan or n-dodecyl mercaptan, particularly preferably n-octyl mercaptan.

Polymerization Stage (II)

The inner layer of the graft copolymer used in one or more embodiments of the present invention is formed by obtaining a soft polymer (II) by polymerizing a monomer mixture (b) containing 40 to 99 wt % of an alkyl acrylate ester, 1 to 60 wt % of benzyl (meth)acrylate, and 0 to 40 wt % of another monomer copolymerizable with the alkyl acrylate ester and the benzyl (meth)acylate and having a double bond and 0.1 to 5 parts by weight of a polyfunctional monomer (per 100 parts by weight of the total amount of the monomer mixture (b)).

The another copolymerizable monomer having a double bond is preferably at least one selected from the group consisting of an aromatic vinyl monomer, a methacrylate ester, and another copolymerizable monomer having a double bond.

The monomer mixture (b) more preferably contains 40 to 99 wt % of an alkyl acrylate ester, 1 to 60 wt % of benzyl (meth)acrylate, 0 to 5 wt % of an aromatic vinyl monomer, and 0 to 15 wt % of another copolymerizable monomer having a double bond. However, from the viewpoint of obtaining a molded article or film having excellent transparency and color and a small phase difference, the monomer mixture (b) even more preferably contains 40 to 99 wt % of an alkyl acrylate ester, 1 to 60 wt % of benzyl (meth)acrylate, 0 to 3 wt % of an aromatic vinyl monomer, and 0 to 15 wt % of another copolymerizable monomer having a double bond.

From the viewpoint of mechanical properties, transparency, color, and reduction in phase difference, the amount of the alkyl acrylate ester contained in the monomer mixture (b) is preferably 40 to 95 wt %, more preferably 40 to 90 wt %, even more preferably 40 to 80 wt %, most preferably 45 to 70 wt %. From the viewpoint of mechanical properties, transparency, color, and reduction in phase difference, the amount of the benzyl (meth)acrylate contained in the monomer mixture (b) is preferably 5 to 60 wt %, more preferably 10 to 60 wt %, even more preferably 20 to 60 wt %, most preferably 25 to 55 wt %.

Examples of the alkyl acrylate ester are the same as those mentioned above with reference to the monomer mixture (a), and preferred specific examples of the alkyl acrylate ester are also the same as those mentioned above with reference to the monomer mixture (a). The alkyl acrylate ester is preferably n-butyl acrylate, a combination of n-butyl acrylate and ethyl acrylate, or a combination of n-butyl acrylate and 2-ethylhexyl acrylate. The n-butyl acrylate content of the alkyl acrylate ester used in the polymerization stage (II) is preferably 50 to 100 wt %, more preferably 70 to 100 wt %, particularly preferably 80 to 100 wt %.

The methacrylate ester is the same as the alkyl methacrylate ester and the methacrylate ester described above with reference to the monomer mixture (a). The aromatic vinyl monomer and the polyfunctional monomer are the same as the aromatic vinyl monomer described above with reference to the monomer mixture (a) and the polyfunctional monomer described above. The another copolymerizable monomer having a double bond other than the methacrylate ester and the aromatic vinyl monomer is the same as the another copolymerizable monomer and the acrylate ester described above with reference to the monomer mixture (a).

Further, in order to allow a molded article or film containing the graft copolymer used in one or more embodiments of the present invention to have excellent transparency and color and to reduce the phase difference of the molded article or the film, from the viewpoint of refractive index and intrinsic birefringence, the amount of each of the monomers constituting the monomer mixture (b) is preferably within the above range for the same reason as described above with reference to the polymerization stage (I).

It is to be noted that the graft copolymer according to one or more embodiments of the present invention has a layer structure in which at least part of the hard polymer (A) formed in the polymerization stage (I) as an innermost layer is covered with the soft polymer (B) formed in the polymerization stage (II). Part of the soft polymer (B) may penetrate into the hard polymer (A). The hard polymer (A) may, of course, be entirely covered with the soft polymer (B).

Polymerization Stage (III)

The outer layer of the graft copolymer used in one or more embodiments of the present invention is formed by obtaining a hard polymer (C) by polymerizing a monomer mixture (c) containing 60 to 100 wt % of an alkyl methacrylate ester, 0 to 10 wt % of benzyl (meth)acrylate, and 40 to 0 wt % of another monomer copolymerizable with the alkyl methacrylate ester and the benzyl (meth)acrylate and 0 to 10 parts by weight of a polyfunctional monomer (per 100 parts by weight of the total amount of the monomer mixture (c)).

The graft copolymer used in one or more embodiments of the present invention has a structure in which the hard polymer (C) corresponding to the outer layer is grafted on the hard polymer (A) and/or the soft polymer (B). However, all the hard polymer (C) does not need to be grafted, and part of the hard polymer (C) may be present as a polymer component without being grafted on the hard polymer (A) and/or the soft polymer (B). The polymer component that is not grafted on the hard polymer (A) and/or the soft polymer (B) is regarded as a constituent part of the graft copolymer used in one or more embodiments of the present invention.

The hard polymer (C) forming the outer layer of the graft copolymer used in one or more embodiments of the present invention may be one obtained by polymerizing the monomer mixture (c) and the polyfunctional monomer, used if necessary, at a time or one obtained by polymerizing the monomer mixture (c) and the polyfunctional monomer, used if necessary, in two or more steps by changing the composition or ratio of the monomers.

The alkyl methacrylate ester to be used may be the same as that described above with reference to the monomer mixture (a), and preferred examples of the alkyl methacrylate ester are also the same as those mentioned above with reference to the monomer mixture (a).

The another copolymerizable monomer having a double bond is preferably at least one selected from the group consisting of an acrylate ester, an aromatic vinyl monomer, and another copolymerizable monomer, and is more preferably one or two or more monomers selected from the group consisting of an alkyl acrylate ester whose alkyl group has 1 to 12 carbon atoms, an aromatic vinyl monomer, and another copolymerizable monomer. The acrylate ester and the aromatic vinyl monomer are the same as the alkyl acrylate ester, the acrylate ester, and the aromatic vinyl monomer described with reference to the monomer mixture (a), and preferred examples thereof are also the same as those mentioned above with reference to the monomer mixture (a). The copolymerizable monomer other than the acrylate ester and the aromatic vinyl monomer are the same as the methacrylate ester other than the alkyl methacrylate ester and the another copolymerizable monomer described above with reference to the monomer mixture (a), and preferred examples thereof are also the same as those mentioned above with reference to the monomer mixture (a). These copolymerizable monomers may be used singly or in combination of two or more of them.

It is preferred that the monomer mixture (c) contains no benzyl (meth)acrylate or contains a small amount of benzyl (meth)acrylate. The hard polymer (C) obtained by polymerizing the monomer mixture (c) plays an important role to make the graft copolymer compatible with the acrylic resin as a matrix to uniformly disperse the graft copolymer in the acrylic resin so that high transparency, excellent color, and high strength are developed. However, there is a possibility that benzyl (meth)acrylate reduces compatibility with the acrylic resin mainly containing methyl methacrylate, and therefore it is preferred that the monomer mixture (c) contains no benzyl (meth)acrylate or contains a small amount of benzyl (meth)acrylate. More specifically, the amount of the benzyl (meth)acrylate contained in the monomer mixture (c) is preferably 0 to 10 wt %, more preferably 0 to 5 wt %, even more preferably 0 to 3 wt %, particularly preferably 0 to 1 wt %, most preferably 0 wt %. The monomer mixture (c) preferably contains 60 to 100 wt % of an alkyl methacrylate ester and 40 to 0 wt % of another copolymerizable monomer having a double bond other than benzyl (meth)acrylate, and more preferably contains 60 to 100 wt % of an alkyl methacrylate ester, 30 to 0 wt % of an alkyl acrylate ester, and 10 to 0 wt % of another copolymerizable monomer having a double bond other than benzyl (meth)acrylate.

Further, from the viewpoint of mechanical properties, transparency, color, and reduction in phase difference, the amount of the alkyl methacrylate ester contained in the monomer mixture (c) is preferably 65 to 100 wt %, more preferably 70 to 100 wt %, even more preferably 75 to 99 wt %, most preferably 80 to 98 wt %.

The another copolymerizable monomer having a double bond other than benzyl (meth)acrylate is preferably at least one selected from the group consisting of an alkyl acrylate ester, an aromatic vinyl monomer, and an unsaturated nitrile-based monomer. More specifically, the monomer mixture (c) more preferably contains 60 to 100 wt % of an alkyl methacrylate ester, 40 to 0 wt % of an alkyl acrylate ester, 0 to 40 wt %0 of an aromatic vinyl monomer, and 0 to 40 wt % of an unsaturated nitrile-based monomer, even more preferably contains 60 to 100 wt % of an alkyl methacrylate ester, 40 to 0 wt % of an alkyl acrylate ester, 0 to 20 wt % of an aromatic vinyl monomer, and 0 to 20 wt % of an unsaturated nitrile-based monomer, even more preferably contains 60 to 100 wt % of an alkyl methacrylate ester, 40 to 0% to of an alkyl acrylate ester, 0 to 10 wt % of an aromatic vinyl monomer, and 0 to 10 wt % of an unsaturated nitrile-based monomer, and most preferably contains 60 to 100 wt % of an alkyl methacrylate ester and 40 to 0 wt % of an alkyl acrylate ester.

The polyfunctional monomer used in the polymerization stage (III) is the same as that described above with reference to the polymerization stage (I). The amount of the polyfunctional monomer used is 0 to 10 parts by weight, preferably 0 to 7 parts by weight, more preferably 0 to 5 parts by weight most preferably 0 to 2 parts by weight per 100 parts by weight of the total amount of the monomer mixture (c).

In the polymerization stage (m), the polyfunctional monomer may or may not be used. However, from the viewpoint of providing a resin composition excellent in mechanical strength, it is preferred that the polyfunctional monomer is not used. The monomer mixture (c) may be the same as or different from the monomer mixture (a).

The graft copolymer used in one or more embodiments of the present invention may be one obtained by performing only the polymerization stages (I) to (III) described above or one obtained by performing, in addition to the polymerization stages (I) to (III), a polymerization stage other than the polymerization stages (I) to (III).

The graft copolymer used in one or more embodiments of the present invention may be one whose hard polymer (C) obtained in the polymerization stage (III) is obtained by (III-1) polymerizing, in the presence of a soft polymer (B), a monomer mixture (c-1) containing 60 to 100 wt % (preferably 70 to 100 wt %) of an alkyl methacrylate ester, 0 to 10 wt % of benzyl (meth)acrylate, and 40 to 0 wt % (preferably 30 to 0 wt %) of another monomer copolymerizable with the alkyl methacrylate ester and the benzyl (meth)acrylate and having a double bond and 0 to 10 parts by weight of a polyfunctional monomer (per 100 parts by weight of the total amount of the monomer mixture (c-1) and by (III-2) further polymerizing a monomer mixture (c-2) containing 60 to 100 wt % of an alkyl methacrylate ester, 0 to 10 wt % of benzyl (meth)acrylate, and 40 to 0 wt % of another monomer copolymerizable with the alkyl methacrylate ester and the benzyl (meth)acrylate and having a double bond and 0 to 10 parts by weight of a polyfunctional monomer (per 100 parts by weight of the total amount of the monomer mixture (c-2)). It is to be noted that a polymer obtained by (III-1) and a polymer obtained by (III-2) are different in composition from each other.

A preferred monomer composition of each of the monomer mixture (c-1) and the monomer mixture (c-2) may be the same as that of the monomer mixture (c). However, from the viewpoint of improving compatibility with the matrix resin, the alkyl methacrylate ester content of the monomer mixture (c-1) is preferably larger than that of the monomer mixture (c-2). From the viewpoint of improving granulatability, the butyl acrylate (corresponding to the another monomer) content of the monomer mixture (c-2) is preferably larger than that of the monomer mixture (c-1).

The total amount of the monomer mixtures (a), (b), and (c) in the polymerization stages (1) to (1) is preferably 80 to 100 parts by weight, more preferably 90 to 100 parts by weight, particularly preferably 95 to 100 parts by weight per 100 parts by weight of the total amount of monomer mixtures constituting the graft copolymer.

The amount of the monomer mixture (b) is preferably 20 to 90 parts by weight, more preferably 40 to 90 parts by weight, particularly preferably 45 to 85 parts by weight per 100 parts by weight of the total amount of monomer mixtures in the graft copolymer.

The amount of the monomer mixture (a) is preferably 0 to 35 parts by weight, more preferably 0.1 to 35 parts by weight, even more preferably 1 to 30 parts by weight, particularly preferably 5 to 30 parts by weight per 100 parts by weight of the total amount of monomer mixtures in the graft copolymer.

The amount of the monomer mixture (c) is preferably 0.1 to 40 parts by weight, more preferably 1 to 30 parts by weight, particularly preferably 5 to 25 parts by weight per 100 parts by weight of the total amount of monomer mixtures in the graft copolymer.

Further, the parts-by-weight ratio between the monomer mixtures (a) and (b) is preferably 10: 90 to 60:40, more preferably 10:90 to 40:60.

Also in the polymerization stages other than the polymerization stage (I) performed to obtain the graft copolymer used in one or more embodiments of the present invention, polymerization of the monomer(s) may be performed in the presence of a chain transfer agent, if necessary. The total amount of a chain transfer agent used is preferably 0.01 to 6 parts by weight, more preferably 0.1 to 4 parts by weight, even more preferably 0.2 to 2 parts by weight particularly preferably 0.24 to 1.6 parts by weight per 100 parts by weight of the total amount of monomer mixtures constituting the graft copolymer used in one or more embodiments of the present invention. In one or more embodiments of the present invention, the "monomer mixture constituting the graft copolymer (monomer mixture in the graft copolymer)" refers to a mixture of copolymerizable monomer components constituting the graft copolymer and having one double bond, that is, a mixture of monomer components other than the polyfunctional monomers. For example, when the graft copolymer is obtained through the polymerization stages (I) to (III), the total amount of monomer mixtures constituting the graft copolymer refers to the total amount of the monomer mixture (a), the monomer mixture (b), and the monomer mixture (c).

The chain transfer agent to be used in the polymerization stages other than the polymerization stage (I) is not particularly limited, and may be a generally-known chain transfer agent. Specific examples of the chain transfer agent include: a primary alkyl mercaptan-based chain transfer agent such as n-butyl mercaptan, n-octyl mercaptan, n-hexadecyl mercaptan, n-dodecyl mercaptan, or n-tetradecyl mercaptan; a secondary alkyl mercaptan-based chain transfer agent such as s-butyl mercaptan or s-dodecyl mercaptan; a tertiary alkyl mercaptan-based chain transfer agent such as t-dodecyl mercaptan or t-tetradecyl mercaptan; a thioglycolate ester such as 2-ethylhexyl thioglycolate, ethylene glycol dithioglycolate, trimethylolpropane tris(thioglycolate), or pentaerythritol tetrakis(thioglycolate); thiophenol; tetraethylthiuram disulfide, pentane phenyl ethane; acrolein methacrolein; allyl alcohol; carbon tetrachloride; ethylene bromide; a styrene oligomer such as α-methylstyrene dimer and terpinolene. Among them, an alkyl mercaptan-based chain transfer agent and thiophenol are preferred. These may be used singly or in combination of two or more of them. Further, from the viewpoint of obtaining a graft copolymer having higher thermal stability, the chain transfer agent to be used in the polymerization stages other than the polymerization stage (I) is more preferably a primary alkyl mercaptan-based chain transfer agent and/or a secondary alkyl mercaptan-based chain transfer agent, particularly preferably the same chain transfer agent as used in the polymerization stage (I). A graft copolymer obtained without using a chain transfer agent in the polymerization stages other than the polymerization stage (I) is also preferred as the graft copolymer used in one or more embodiments of the present invention.

The graft copolymer used in one or more embodiments of the present invention can be produced by common emulsion polymerization using a known emulsifier. Examples of the emulsifier include: an anion surfactant such as sodium alkyl sulfonate, sodium alkylbenzene sulfonate, sodium dioctyl sulfosuccinate, sodium lauryl sulfate, a fatty acid sodium salt, or a phosphate ester salt such as sodium polyoxyethylene lauryl ether phosphate; and a nonionic surfactant. These surfactants may be used singly or in combination of two or more of them. Particularly, from the viewpoint of improving the thermal stability of a resin composition containing the graft copolymer and an acrylic resin and a molded article of the resin composition, emulsion polymerization is preferably performed using a phosphate ester salt (especially, an alkali metal phosphate ester salt or an alkaline-earth metal phosphate ester salt) such as sodium polyoxyethylene lauryl ether phosphate. It is to be noted that the phosphate ester salt may be formed by reacting, in a polymerization system, a phosphate ester and an alkali compound such as sodium hydroxide.

From the viewpoint of improving the thermal stability of the resin composition containing the acrylic resin and the graft copolymer and a molded article of the resin composition, a polymerization initiator to be used in the multistage polymerization for obtaining the graft copolymer used in one or more embodiments of the present invention is preferably one whose 10-hr half-life temperature is 100° C. or lower. The polymerization initiator is not particularly limited as long as its 10-hr half-life temperature is 100° C. or lower, but is preferably a persulfate such as potassium persulfate, sodium persulfate, or ammonium persulfate Among them, potassium persulfate is particularly preferred.

Further, the polymerization is preferably performed by a method in which radicals are generated by cleaving the polymerization initiator substantially only by a pyrolysis mechanism. An alternative to such a method is a method described in the example in Japanese Patent No. 3960631 in which an oxidizing agent such as ferrous sulfate and a reducing agent such as sodium formaldehyde sulfoxylate are used in combination as a redox initiator to generate radicals from a reagent that can generate radicals at low temperature. However, when such a redox initiator system is applied to one or more embodiments of the present invention, there is a case where a large amount of radicals is generated at a time. More specifically, when a polymer layer mainly containing a methacrylate ester is formed by polymerization using a redox initiator in at least the polymerization stage (I), there is a case where a large amount of radicals is generated at a time, and therefore a bond that is cleaved by relatively low energy, such as a head-to-head bond, is formed in the polymer mainly containing a methacrylate ester. In this case, when the graft copolymer is exposed to high temperatures during molding processing or the like, such a bond is likely to become a starting point of zipping depolymerization so that the thermal stability of the graft copolymer is significantly impaired, which as a result may impair the color of a resulting molded article or cause defective molding such as mold staining. For this reason, the polymerization initiator is preferably cleaved only by a pyrolysis mechanism without using a redox initiator.

From the above viewpoint, the 10-hr half-life temperature of the polymerization initiator is preferably 100° C. or lower, more preferably 90° C. or lower, even more preferably 80° C. or lower, particularly preferably 75° C. or lower.

The polymerization initiator is preferably used for polymerization in at least the polymerization stage (I) performed to obtain the graft copolymer, and is more preferably used for polymerization in the polymerization stage performed to obtain the graft copolymer in which a chain transfer agent such as n-octyl mercaptan is used. Particularly preferably, the polymerization initiator is used for polymerization in all the polymerization stages performed to obtain the graft copolymer.

An indicator of the thermal stability of the graft copolymer may be a weight loss temperature determined by heating the polymer. The graft copolymer used in one or more embodiments of the present invention preferably has a 1% weight loss temperature of 270° C. or higher and a 5% weight loss temperature of 310° C. or higher as measured by thermal stability analysis (TGA). The 1% weight loss temperature is more preferably 275° C. or higher, even more preferably 280° C. or higher, particularly preferably 290° C. or higher. The 5% weight loss temperature is more preferably 315° C. or higher, even more preferably 320° C. or higher, particularly preferably 330° C. or higher. When the graft copolymer has a 1% weight loss temperature of 270° C. or higher and a 5% weight loss temperature of 310° C. or higher, a resin composition (molded article or film) containing the acrylic resin and the graft copolymer is excellent in color Here, when the YI value of the molded article or the film is lower, the molded article or the film has lower yellowness and is therefore regarded as excellent in color.

In one or more embodiments of the present invention, the gel content of the graft copolymer is represented as the weight ratio of a component insoluble in methyl ethyl ketone. The gel content of the graft copolymer used in one or more embodiments of the present invention is 65% or higher, preferably 68% or higher, more preferably 70% or higher. Further, the gel content is 84% or lower, preferably 83% or lower, more preferably 82% or lower, even more preferably 80% or lower. If the gel content is lower than 65%, a resulting molded article is less likely to have adequate impact resistance, or a resulting acrylic resin film is less likely to have adequate mechanical properties such as bending resistance, cracking resistance during slitting, and cracking resistance during punching. On the other hand, if the gel content exceeds 84%, there is a case where the resin composition according to one or more embodiments of the present invention is poor in fluidity during molding.

A polymer (cross-linked structure polymer) formed, when the polymerization stage (I) is not performed, by performing up to the polymerization stage (II) to form the inner layer of the graft copolymer used in one or more embodiments of the present invention or a polymer (cross-linked structure polymer) formed, when the polymerization stage (I) is performed, by performing up to the polymerization stage (II) to form the inner layer of the graft copolymer used in one or more embodiments of the present invention, that is, by performing at least the polymerization stages (I) and (II) preferably has an average particle diameter of 50 to 400 nm, more preferably has an average particle diameter of 80 to 350 nm, even more preferably has an average particle diameter of 100 to 320 nm, and particularly preferably has an average particle diameter of 120 to 300 nm. From the viewpoint of balance of improvement in mechanical properties and transparency or color, the average particle diameter is particularly preferably 150 nm to 300 nm, more particularly preferably 180 to 280 nm, most preferably 200 to 270 nm. Here, the average particle diameter is determined by measuring 546 nm light scattered from a polymer latex with the use of a spectrophotometer.

In one or more embodiments of the present invention, the ratio of a polymer (e.g., a hard polymer (C)) obtained after the polymerization stage (II) and grafted on a cross-linked structure polymer that is obtained by performing up to the polymerization stage (II), that is, by performing at least the polymerization stages (I) and (II) and that constitutes the graft copolymer is determined as a graft ratio of the graft copolymer.

The graft ratio of the graft copolymer is represented as a weight ratio of a polymer obtained after the polymerization stage (II) and grafted on a cross-linked structure polymer that is obtained by performing up to the polymerization stage (II), that is, by performing at least the polymerization stages (I) and (II) and that constitutes the graft copolymer when the weight of the cross-linked structure polymer is defined as 100.

The graft ratio of the graft copolymer used in one or more embodiments of the present invention is preferably 20% or lower, more preferably 10% or lower, particularly preferably 8% or lower. Further, the graft ratio is preferably −20% or higher, more preferably −10% or higher. Here, on the basis of a calculation formula for determining the graft ratio which will be described later, a negative graft ratio means that even after a cross-linked structure polymer is obtained by performing up to the polymerization stage (II), a polymer component that is not cross-linked to the cross-linked structure polymer is present.

The resin composition according to one or more embodiments of the present invention containing the acrylic resin and the graft copolymer can offer excellent color or transparency and excellent mechanical properties even when the graft ratio of the graft polymer is low.

The thus obtained graft copolymer latex is spray-dried to obtain a powdery graft copolymer. Alternatively, as generally known, the graft copolymer latex may be coagulated by adding a salt or an acid, heat-treated, filtered, washed, and then dried to obtain a powdery graft copolymer. Particularly preferably, the graft copolymer latex is coagulated using a salt. The salt to be used is not particularly limited, but is preferably a bivalent salt such as a calcium salt such as calcium chloride or a magnesium salt such as magnesium chloride or magnesium sulfate, and is particularly preferably a magnesium salt such as magnesium chloride or magnesium sulfate. If necessary, an antioxidant or an ultraviolet absorber usually added during coagulation may be added.

Further, if necessary, the graft copolymer latex may be filtered through a filter, a mesh, or the like before coagulation to remove fine polymerization scale, which makes it possible to reduce fish-eyes or foreign objects resulting from such fine polymerization scale to improve the appearance of a molded article and a film according to one or more embodiments of the present invention.

It is known that the mechanical strength of an acrylic resin or the like is improved by adding a soft polymer. However, in this case, there is a drawback that the soft polymer is homogeneously mixed with a matrix resin (here corresponding to the acrylic resin) so that a resulting molded article has low heat resistance. On the other hand, when a graft copolymer is added which has a soft cross-linked polymer layer and a hard polymer layer (also called multistage-polymerized polymer, multilayer structure polymer or core-shell polymer), a resulting molded article has a discontinuous sea-island structure in which the soft cross-linked polymer layer corresponds to "island" and the matrix resin and the hard polymer layer coating the soft cross-linked polymer layer correspond to "sea". Therefore, the graft copolymer is effective at improving mechanical strength almost without reducing heat resistance. The soft cross-linked polymer layer sometimes has a hard cross-linked polymer layer on the inner side thereof. Further, the soft cross-linked polymer generally has a composition different from that of the matrix resin, which makes it difficult to uniformly disperse the soft cross-linked polymer in the matrix resin. Therefore, the soft cross-linked polymer causes a deterioration in optical properties such as transparency or defects such as fish-eyes, and further causes a reduction in mechanical strength. However in the case of the graft copolymer having both a soft cross-linked polymer layer and a hard polymer layer, the soft cross-linked polymer layer can be uniformly dispersed in the matrix.

From the viewpoint of transparency and mechanical strength, the average particle diameter of "islands (domains)" in the resin composition (molded article or film) in which the graft copolymer is dispersed in the acrylic resin is preferably 50 to 400 nm. From the viewpoint of mechanical strength, the average particle diameter is more preferably 80 nm or more, even more preferably 100 nm or more. On the other hand, from the viewpoint of transparency, the average particle diameter is more preferably 350 nm or less, even more preferably 320 nm or less. Here, the average particle diameter of islands (domains) refers to the average particle diameter of 30 rubber particles determined in the following manner. An ultrathin slice is cut out from the molded article or the film with the use of a diamond knife. Then, the slice is stained with a staining agent such as ruthenium tetraoxide or osmium tetraoxide, and its image observed with a scanning electron microscope is taken. Then, 30 rubber particles appearing in their entirety in the image as islands (domains) are randomly selected, the particle diameter of each of the rubber particles is measured, and the average particle diameter of these rubber particles is determined.

In one or more embodiments of the present invention, the term "soft" means that the glass transition temperature of the polymer is lower than 20° C. From the viewpoint of enhancing the ability of the soft layer to absorb impact and enhancing the effect of improving impact resistance such as cracking resistance, the glass transition temperature of the polymer is preferably lower than 0° C., more preferably lower than −20° C.

In one or more embodiments of the present invention, the term "hard" means that the glass transition temperature of the polymer is 20° C. or higher. If the glass transition temperature of the polymer (I) or (III) is lower than 20° C., the heat resistance of the resin composition, the molded article, or the film according to one or more embodiments of the present invention may be reduced, or the graft copolymer may be likely to become coarse or agglomerated during the production of the graft copolymer.

In one or more embodiments of the present invention, the glass transition temperature of the "soft" or "hard" polymer is calculated by the FOX equation using values described in Polymer Hand Book (J. Brandrup, Interscience 1989) (for example, the glass transition temperature of polymethyl methacrylate is 105° C. and the glass transition temperature of polybutyl acrylate is −54° C.).

The graft copolymer obtained in the above-described manner offers an excellent balance of appearance, transparency, weather resistance, luster, processability, and thermal stability, and can be blended with various acrylic resins. When the graft copolymer is blended with an acrylic resin, a resin composition excellent in thermal stability, weather resistance, luster, and processability can be provided without impairing excellent color, appearance, and transparency characteristic of acrylic resin.

(Resin Composition)

The mixing ratio of the acrylic resin and the graft copolymer varies depending on the intended use of a resulting molded article or film, but 40 to 98 parts by weight of the acrylic resin and 60 to 2 parts by weight of the graft copolymer (per 100 parts by weight of the total amount of the acrylic resin and the graft copolymer) are preferably mixed, 50 to 95 parts by weight of the acrylic resin and 50 to 5 parts by weight of the graft copolymer are more preferably mixed, 55 to 95 parts by weight of the acrylic resin and the 45 to 5 parts by weight of the graft copolymer are particularly preferably mixed, 55 to 90 parts by weight of the acrylic resin and 45 to 10 parts by weight of the graft copolymer are even more preferably mixed, and 60 to 85 parts by weight of the acrylic resin and 40 to 15 parts by weight of the graft copolymer are particularly preferably mixed. If the amount of the acrylic resin is less than 40 parts by weight there is a case where properties characteristic of the acrylic resin is lost, and if the amount of the acrylic resin exceeds 98 parts by weight, there is a case where mechanical strength such as impact strength is not sufficiently improved.

A mixing method used to prepare the resin composition according to one or more embodiments of the present invention is not particularly limited, and various known methods such as extrusion kneading and roll kneading may be used.

If necessary, the resin composition according to one or more embodiments of the present invention may contain any known additive such as a light stabilizer, a UV absorber, a heat stabilizer, a delustering agent, a light diffusing agent, a coloring agent, a dye, a pigment, an antistatic agent a heat reflecting agent, a lubricant, a plasticizer, a UV absorber, a stabilizer, or a filler, or another resin such as a polyethylene terephthalate resin or a polybutylene terephthalate resin.

From the viewpoint of adjusting orientation birefringence, inorganic fine particles having birefringence described in Japanese Patent Nos. 3648201 and 4336586 or a low molecular compound having birefringence and a molecular weight of 5000 or less, preferably 1000 or less described in Japanese Patent No. 3696649 may be appropriately added to the resin composition according to one or more embodiments of the present invention.

When the transparency of a molded article (2 mm thick) obtained by molding the resin composition according to one or more embodiments of the present invention is expressed as, for example, haze, the haze is preferably 2% or less, more preferably 1.5% or less, most preferably 1% or less.

When the color of a molded article (2 mm thick) obtained by molding the resin composition according to one or more embodiments of the present invention is expressed as transparent YI (yellowness index), the transparent YI is preferably 4 or less, more preferably 3 or less, even more preferably 2.5 or less, particularly preferably 1.5 or less, most preferably 1.0 or less.

Further, a molded article obtained by molding the resin composition according to one or more embodiments of the present invention has high mechanical strength, especially high impact resistance. The Izod impact strength, which is one of the indicators of impact resistance, of the molded article as measured in accordance with an evaluation method used in Examples 1 and 2 is preferably 29 J/m or more, more preferably 35 Jim or more, even more preferably 40 J/m or more, most preferably 45 J/m or more, in which case the molded article can offer excellent impact resistance while maintaining high transparency and excellent color. The Izod impact strength of the molded article as measured in accordance with an evaluation method used in Examples 3 to 5 is preferably 2.5 kJ/m$^2$ or more, more preferably 3.0 kJ/m$^2$ or more, even more preferably 3.5 kJ/m$^2$ or more, most preferably 4.0 kJ/m$^2$ or more, in which case the molded article can offer excellent impact resistance.

Further, the Gardner impact of the molded article as measured at 23° C. in accordance with ASTM D 3029-GB using a 1.7 kg weight is preferably 20 kg·cm or more, more preferably 50 kg·cm or more, even more preferably 80 kg·cm or more, most preferably 100 kg·cm or more, in which case the molded article can offer excellent impact resistance.

A molded article obtained by injection-molding the resin composition according to one or more embodiments of the present invention has a small phase difference. When the resin composition according to one or more embodiments of the present invention is molded to obtain a molded article having a thickness of 2 mm, the maximum phase difference of the molded article is preferably 300 nm or less, more preferably 200 nm or less, even more preferably 100 nm or less, still even more preferably 50 nm or less, most preferably 30 nm or less. Here, the phase difference of the injection-molded article is measured by phase-contrast imaging that will be described later.

From the viewpoint of excellent heat resistance, the deflection temperature under load (HDT) of a molded article obtained by molding the resin composition according to one or more embodiments of the present invention is 80° C. or higher, more preferably 90° C. or higher, even more preferably 95° C. or higher, still even more preferably 100° C. or higher.

(Acrylic Resin Film)

A molded article according to one or more embodiments of the present invention can be obtained by molding the resin composition according to one or more embodiments of the present invention by a known molding method. For example, the molded article according to one or more embodiments of the present invention is obtained by appropriately molding the resin composition according to one or more embodiments of the present invention by an injection molding method, a pressing method, a common melt extrusion method such as an inflation method or a T-die extrusion method, a calender method, or a solvent casting method. Particularly, molding by a melt extrusion method using no solvent is significant because the resin composition according to one or more embodiments of the present invention has excellent optical isotropy.

Hereinbelow, a method for producing an acrylic resin film by melt extrusion molding will be described in detail as one example of a method for producing an acrylic resin film according to one or more embodiments of the present invention.

When the resin composition according to one or more embodiments of the present invention is molded into a film by melt extrusion, the resin composition according to one or more embodiments of the present invention is first supplied to an extruder and melted by heating. When the resin composition is supplied to an extruder, each of the components of the resin composition may be directly supplied as particles to the extruder, or pellets of the resin composition previously prepared by the extruder may be supplied to the extruder.

The resin composition according to one or more embodiments of the present invention is preferably subjected to preliminary drying before supplied to the extruder. Such preliminary drying makes it possible to prevent the resin composition extruded from the extruder from foaming. A method of the preliminary drying is not particularly limited. For example, the raw material (i.e., the resin composition according to one or more embodiments of the present invention) formed into pellets or the like may be dried in a hot-air drier or the like.

The extruder for molding the resin composition according to one or more embodiments of the present invention into a film preferably has one or more devolatilizers for removing volatile matter generated during melting by heating. By providing such a devolatilizer, it is possible to reduce deterioration of film appearance caused by foaming or decomposition/deterioration reaction of the resin.

When the resin composition according to one or more embodiments of the present invention is molded into a film by melt extrusion, an inert gas such as nitrogen or helium is preferably supplied to a cylinder of the extruder together with the resin material. The supply of an inert gas reduces the concentration of oxygen in a system, which makes it possible to reduce decomposition caused by oxidation degradation, cross-linking, degradation of appearance or quality such as yellowing.

Then, the resin composition melted by heating in the extruder is supplied through a gear pump or a filter to a T-die. At this time, the use of a gear pump makes it possible to improve the uniformity of the amount of the resin to be extruded to reduce thickness variation. On the other hand, the use of a filter makes it possible to remove foreign matter in the resin composition to obtain a film having an excellent appearance without defects.

The filter to be used is preferably a stainless steel leaf disc filter capable of removing foreign matter from a melted polymer, and a filter element to be used is preferably of fiber type, powder type, or complex type thereof. The filter can be suitably used for an extruder or the like for use in pelletization or film formation.

Then, the resin composition supplied to the T-die is extruded through the T-die as a sheet-shaped melted resin. Then, the sheet-shaped melted resin is cooled using two or more cooling rolls. Usually, the T-die is arranged so that the melted resin comes into contact with the first casting roll provided on the most upstream side (on the side close to the die). In general two cooling rolls are used. The temperature of the casting roll is preferably 50° C. to 160° C., more preferably 60° C. to 120° C. Then, the film is stripped from the casting roll, passed between nip rolls, and rolled up.

Examples of a method for bringing the resin into close contact with the casting roll include a touch roll method, a nip roll method, an electrostatic application method, an air knife method, a vacuum chamber method, a calender method, and a sleeve method. An appropriate method is selected according to the thickness or intended use of the film. When an optical film having a low optical distortion is formed, a touch roll method is preferably used. In the touch roll method, an elastic roll having a double cylindrical structure using a metal sleeve is particularly preferably used. The temperature of the touch roll is preferably 40° C. to 120° C., more preferably 50° C. to 100° C.

When the resin composition is molded into a film, if necessary, both surfaces of the film may be brought into contact with (the film may be sandwiched between) rolls or metal belts, especially rolls or metal belts heated to a temperature around the glass transition temperature, at the same time so that the film can have more excellent surface properties.

One of the two cooling rolls sandwiching the sheet-shaped melted resin is preferably a rigid metal roll having a smooth surface, and the other cooling roll is preferably a flexible roll having an elastically-deformable metal elastic external cylinder having a smooth surface.

When the sheet-shaped melted resin is cooled by sandwiching between such rigid metal roll and flexible roll having a metal elastic external cylinder to form a film, surface micro-irregularities, die lines, or the like are corrected so that the film can have a smooth surface and a thickness variation of 5 μm or less. It is to be noted that the term "cooling roll" used herein includes the meaning of "touch roll" and "cooling roll".

The thickness of the acrylic resin film according to one or more embodiments of the present invention is not particularly limited, but is preferably 500 μm or less, more preferably 300 μm or less, particularly preferably 200 μm or less. Further, the thickness is preferably 10 μm or more, more preferably 30 μm or more, even more preferably 50 μm or more, particularly preferably 60 μm or more. When the thickness of the film is within the above range, there is an advantage that, when vacuum molding is performed using the film, deformation is less likely to occur and a deep-drawn portion is less likely to be broken, and further the film can have uniform optical properties and excellent transparency. On the other hand, if the thickness of the film exceeds the above upper limit, the film is non-uniformly cooled after molding, and therefore tends to have non-uniform optical properties. If the thickness of the film is less than the above lower limit, there is a case where the film is difficult to be handled.

The total light transmittance of the acrylic resin film according to one or more embodiments of the present invention is preferably 85% or higher, more preferably 88% or higher, even more preferably 90% or higher. When the total light transmittance is within the above range, the film has high transparency, and is therefore suitable for optical members required to have light permeability, decorative applications, interior applications, and vacuum molding.

The glass transition temperature of the acrylic resin film according to one or more embodiments of the present invention is preferably 90° C. or higher, more preferably 100° C. or higher, even more preferably 110° C. or higher, still even more preferably 115° C. or higher, particularly preferably 120° C. or higher, most preferably 124° C. or higher. When the glass transition temperature is within the above range, the acrylic resin film can have excellent heat resistance.

The haze of the acrylic resin film according to one or more embodiments of the present invention is preferably 2.0% or less, more preferably 1.5% or less, even more preferably 1.3% or less, particularly preferably 1.0% or less. Further, the inner haze of the film is preferably 1.5% or less, more preferably 1.0% or less, even more preferably 0.6% or less, even more preferably 0.5% or less, even more preferably 0.4% or less, particularly preferably 0.3% or less, most preferably 0.2% or less. When the haze and the inner haze are within their respective ranges described above, the film has high transparency, and is therefore suitable for optical members required to have light permeability, decorative applications, interior applications, and vacuum molding. It is to be noted that the haze includes the haze of inside of the film and the haze of surface (outside) of the film which are referred to as inner haze and outer haze, respectively.

The acrylic resin film according to one or more embodiments of the present invention can be used also as an optical film. Particularly, when the acrylic resin film is used as a polarizer protective film, the acrylic resin film preferably has small optical anisotropy. Particularly, the acrylic resin film preferably has small optical anisotropy not only in its in-plane directions (length direction, width direction) but also in its thickness direction. That is, the absolute value of the in-plane phase difference Re and the absolute value of the thickness-direction phase difference Rth of the acrylic resin film are both preferably small. More specifically, the absolute value of the in-plane phase difference Re is preferably 5 nm or less, more preferably 3 nm or less, even more preferably 2 nm or less, particularly preferably 1 nm or less, most preferably 0.3 nm or less. Further, the absolute value of the thickness-direction phase difference Rth is preferably 4.0 nm or less, more preferably 3.0 nm or less, even more preferably 2.0 nm or less, most preferably 1.0 nm or less. The film having such phase differences is suitable for use as a polarizer protective film of a polarizer in a liquid crystal display device. On the other hand, if the absolute value of the in-plane phase difference Re of the film exceeds 5 nm or the absolute value of the thickness-direction phase difference Rth of the film exceeds 4.0 nm, there is a case where, when the film is used as a polarizer protective film of a polarizer in a liquid crystal display device, reduction in the contrast of the liquid crystal display device may occur.

Phase differences are indicator values calculated on the basis of birefringence, and an in-plane phase difference (Re) and a thickness-direction phase difference (Rth) can be calculated by the following formulas, respectively. In the case of an ideal film that is completely optically isotropic in three-dimensional directions, its in-plane phase difference Re and thickness-direction phase difference Rth are both 0.

$$Re=(nx-ny)\times d$$

$$Rth=((nx+ny)/2-nz)\times d$$

In the above formulas, nx, ny, and nz represent refractive indexes in X, Y, and Z axis directions, respectively, at the time when an in-plane extension direction (orientation direction of polymer chains) is defined as an X axis, a direction orthogonal to the X axis is defined as a Y axis, and the thickness direction of a film is defined as a Z axis. Further, d represents the thickness of the film and nx−ny represents orientation birefringence. It is to be noted that in the case of a melt-extruded film, the MD direction corresponds to the X axis, and in the case of a stretched film, the stretching direction corresponds to the X axis.

The acrylic resin film according to one or more embodiments of the present invention has excellent bending resistance. The bending resistance can be evaluated by measuring the number of bending times in accordance with a method specified in JIS C5016. The number of bending times the acrylic resin according to one or more embodiments of the present invention is preferably 200 times or more, more preferably 400 times or more, even more preferably 600 times or more, particularly preferably 700 times or more, most preferably 800 times or more. In one or more embodiments of the present invention, the number of bending times is measured under conditions of a measuring angle of 135°, a speed of 175 times/min, R=0.38, and a load of 200 g.

(Stretching)

The acrylic resin film according to one or more embodiments of the present invention has high toughness and high flexibility even as an unstretched film. However, the acrylic resin film may further be stretched to improve mechanical strength and film thickness accuracy.

When the acrylic resin film according to one or more embodiments of the present invention is a stretched film, the stretched film (uniaxially stretched film or biaxially stretched film) can be produced by once molding the resin composition according to one or more embodiments of the present invention into an unstretched film and then uniaxially or biaxially stretching the unstretched film. The acrylic resin film according to one or more embodiments of the present invention may include both the stretched film and the unstretched film.

In this description, for convenience of description, a film that is obtained by molding the resin composition according to one or more embodiments of the present invention but is not yet subjected to stretching, that is, an unstretched film is referred to as "raw film".

When stretched, a raw film may be continuously stretched immediately after molding, or may be stretched after once stored or transferred after molding. It is to be noted that when stretched immediately after molding, a raw film may be stretched within a very short time (in some cases, instantaneously) after molding or after a lapse of time from production in the process of film production.

When the acrylic resin film according to one or more embodiments of the present invention is produced as a stretched film, the raw film does not need to be in a complete film state as long as the raw film is kept in a film state to the extent that it can be stretched.

A method for stretching the raw film is not particularly limited, and any conventionally-known stretching method may be used. Specific examples of such a method include transverse stretching using a tenter, longitudinal stretching using rolls, and successive biaxial stretching in which transverse stretching and longitudinal stretching are successively performed in combination. Alternatively, a simultaneous biaxial stretching method may be used in which longitudinal stretching and transverse stretching are performed at the same time, or a method may be used in which longitudinal stretching using rolls is performed and then transverse stretching using a tenter is performed.

When stretched, the raw film is preferably once preheated to a temperature higher than a stretching temperature by 0.5° C. to 5° C., preferably 1° C. to 3° C. and then cooled to the stretching temperature before stretching. By preheating the raw film to a temperature within the above range, it is possible to accurately maintain the thickness of the raw film, or it is possible to prevent a resulting stretched film from having a low thickness accuracy or a thickness variation. Further, it is also possible to prevent the raw film from adhering to rolls or sagging under its own weight. On the other hand, if the preheating temperature of the raw film is too high, an adverse effect tends to occur, such as adhesion of the raw film to rolls or sagging of the raw film under its own weight. Further, if the difference between the preheating temperature and the stretching temperature of the raw film is small, the raw film before stretching tends to be difficult to maintain thickness accuracy, or a resulting stretched film tends to have a large thickness variation or a low thickness accuracy.

The stretching temperature at which the raw film is stretched is not particularly limited, and may be changed according to mechanical strength, surface properties, and thickness accuracy required of a stretched film to be produced.

When the glass transition temperature of the raw film determined by a DSC method is defined as Tg, the stretching temperature is generally preferably in the range of (Tg−30° C.) to (Tg+30° C.), more preferably in the range of (Tg−20° C.) to (Tg+20° C.), even more preferably in the range of (Tg) to (Tg+20° C.). When the stretching temperature is within the above range, it is possible to reduce the thickness variation of a resulting stretched film, and it is also possible to improve the mechanical properties of the film such as percentage of elongation, tear propagation strength, and resistance to flexural fatigue. Further, it is also possible to avoid trouble such as adhesion of the film to rolls.

On the other hand, if the stretching temperature is higher than the above upper limit, a resulting stretched film tends to have a large thickness variation, or the mechanical properties of the film such as percentage of elongation, tear propagation strength, and resistance to flexural fatigue tend not to be sufficiently improved. Further, trouble such as adhesion of the film to rolls tends to easily occur. Further, if the stretching temperature is lower than the above lower limit, a resulting stretched film tends to have a high haze, or in an extreme case, tearing or cracking of the film tend to occur during the production process.

When the raw film is stretched, its stretching ratio is not particularly limited, and may be determined according to mechanical strength, surface properties, and thickness accuracy required of a stretched film to be produced. Depending on the stretching temperature, the stretching ratio is generally preferably selected in the range of 1.1 times to 3 times, more preferably selected in the range of 1.3 times to 2.5 times, even more preferably selected in the range of 1.5 times to 2.3 times. When the stretching ratio is within the above range, the mechanical properties of the film such as percentage of elongation, tear propagation strength, and resistance to flexural fatigue can be significantly improved.

The thickness of the acrylic resin film according to one or more embodiments of the present invention as a stretched film is not particularly limited, but is, similarly to the above, preferably 500 µm or less, more preferably 300 µm or less, particularly preferably 200 µm or less. Further, the thickness is preferably 10 µm or more, more preferably 30 µm or more, even more preferably 50 µm or more, particularly preferably 60 µm or more.

The total light transmittance of the acrylic resin film according to one or more embodiments of the present invention as a stretched film is preferably 85% or higher, more preferably 88% or higher, even more preferably 90% or higher. When the total light transmittance is wt % within the above range, the film has high transparency, and is therefore suitable for optical members required to have light permeability, decorative applications, interior applications, and vacuum molding.

The haze of the acrylic resin film of one or more embodiments of the present invention as a stretched film is preferably 2.09% or less, more preferably 1.5% or less, more preferably 1.3% or less, particularly preferably 1.0% or less, even more preferably 0.6% or less, even more preferably 0.5% or less, even more preferably 0.4% or less, particularly preferably 0.3% or less, most preferably 0.2% or less. Further, the inner haze of the stretched film is preferably 1.5% or less, more preferably 1.0% or less, even more preferably 0.6% or less, particularly preferably 0.3% or less. When the haze and the inner haze are within their respective ranges described above, the film has high transparency, and is therefore suitable for optical members required to have light permeability, decorative applications, interior applications, and vacuum molding.

The acrylic resin film according to one or more embodiments of the present invention as a stretched film can be used also as an optical film. The absolute value of the in-plane phase difference Re of the stretched film according to one or more embodiments of the present invention is preferably 5 nm or less, more preferably 3 nm or less, even more preferably 2 nm or less, particularly preferably 1 nm or less, most preferably 0.3 nm or less. Further, the absolute value of the thickness-direction phase difference Rth is preferably 4.0 nm or less, more preferably 3.5 nm or less, even more preferably 3.0 nm or less, still even more preferably 2.0 nm or less, yet even more preferably 1.0 nm or less, most preferably 0.5 nm or less.

The acrylic resin film according to one or more embodiments of the present invention as a stretched film has excellent bending resistance, and the number of bending times as measured by the above-described method is preferably 200 times or more, more preferably 400 times or more, even more preferably 600 times or more, particularly preferably 700 times or more, most preferably 800 times or more.

(Applications)

The resin composition and the molded article according to one or more embodiments of the present invention can be used for various purposes by taking advantage of their optical properties such as color, appearance, and transparency, and mechanical strength such as impact resistance and bending resistance. For example, the resin composition and the molded article according to one or more embodiments of the present invention can be used for automobile headlights, tail lamp lenses, inner lenses, instrument covers, sunroofs, and the like for use in the field of vehicles; head-up displays, display front panels, and the like for use in the field of displays, road signs, bathroom fitments, floor materials, translucent panels for roads, lenses for double glazing, lighting windows, carports, lenses for lighting, lighting covers, sidings for construction materials, and the like for use in the fields of architecture and construction materials; microwave cooking vessels (dishes); housings for home appliances; toys; sunglasses; and stationery.

If necessary, the surface gloss of the acrylic resin film according to one or more embodiments of the present invention can be reduced by a known method. This can be achieved by, for example, kneading the resin composition with an inorganic filler or cross-linkable polymer particles. Alternatively, the film obtained may be embossed to reduce its surface gloss.

If necessary, the acrylic resin film according to one or more embodiments of the present invention may be laminated on another film with an adhesive or coated with a surface coating layer such as a hard coat layer before use.

The acrylic resin film according to one or more embodiments of the present invention can be used for various purposes by taking advantage of its properties such as heat resistance, transparency, and flexibility. For example, the acrylic resin film according to one or more embodiments of the present invention can be used for interior and exterior of automobiles, personal computers, mobile devices, and solar batteries; solar battery backsheets; image taking lenses for cameras, VTRs, and projectors, finders, filters, prisms, Fresnel lenses, lens covers and the like for use in the field of imaging; lenses such as pick-up lenses for optical discs in CD players, DVD players, MD players and the like; optical discs such as CDs, DVDs, and MDs for use in the field of optical recording; films for organic EL devices, films for liquid crystal displays such as light guide plates, diffuser plates, backsheets, reflection sheets, polarizer protective films, polarizing film transparent resin sheets, phase difference films, light diffusion films, and prism sheets, and surface protective films for use in the field of information devices; optical fibers, optical switches, optical connectors and the like for use in the field of optical communications; car headlights, tail lamp lenses, inner lenses, instrument covers, sunroofs and the like for use in the field of vehicles; eyeglasses, contact lenses, lenses for endoscopes, and medical supplies requiring sterilization for use in the field of medical devices; road signs, bathroom fitments, floor materials, translucent panels for roads, lenses for double glazing, lighting windows, carports, lenses for lighting, lighting covers, sidings for construction materials and the like for use in the fields of architecture and construction materials; microwave cooking vessels (dishes); housings for home appliances; toys; sunglasses; and stationery. Further, the film according to one or more embodiments of the present invention can be used also as a substitute for a molded product using a transfer foil sheet.

The acrylic resin film according to one or more embodiments of the present invention can be used by laminating it on a base material such as a metal or plastic. Examples of a method for laminating the acrylic resin film include lamination molding, wet lamination in which an adhesive is applied onto a metal plate, such as a steel plate, and then the film is placed on and bonded to the metal plate by drying, dry lamination, extrusion lamination, and hot melt lamination. Examples of a method for laminating the film on a plastic part include insert molding or laminate injection press molding in which the film is placed in a mold and then a resin is injected into the mold, and in-mold molding in which the preliminarily-molded film is placed in a mold and then a resin is injected into the mold.

A laminate using the acrylic resin film according to one or more embodiments of the present invention can be used for alternatives to painting such as interior or exterior materials for automobiles, building materials such as window frames, bathroom fitments, wallpapers, and floor materials, daily goods, housings for furniture and electric devices, housings for OA equipment such as facsimiles, notebook computers, and copy machines, front panels for liquid crystal displays in terminals such as mobile phones, smartphones, and tablets, optical members such as lighting lenses, car headlights, optical lenses, optical fibers, optical discs, and light guide plates for liquid crystal displays, parts of electric or electronic devices, medical supplies requiring sterilization, toys, and recreational goods.

Particularly, the acrylic resin film according to one or more embodiments of the present invention excellent in heat resistance and optical properties is suitable as an optical film, and therefore can be used for various optical members. For example, the acrylic resin film according to one or more embodiments of the present invention can be used for known optical applications such as front panels for liquid crystal displays in terminals such as mobile phones, smartphones and tablets, lighting lenses, car headlights, optical lenses, optical fibers, optical discs, liquid crystal display peripherals such as light guide plates for liquid crystal displays, diffuser plates, backsheets, reflection sheets, polarizing film transparent resin sheets, phase difference films, optical diffusion films, prism sheets, surface protective films, optical isotopic films, polarizer protective films, and transparent conductive films, organic EL device peripherals, and optical communication fields.

EXAMPLES

Hereinbelow one or more embodiments of the present invention will be more specifically described with reference to examples, but is not limited to these examples. The terms "part(s)" and "%" as used hereinafter refer to "part(s) by weight" and "% by weight", respectively, unless otherwise specified.

(Average Particle Diameter of Polymer Obtained by Performing Up to Polymerization for Forming Inner Layer of Graft Copolymer)

The average particle diameter of a polymer was measured using a polymer latex obtained by performing polymerization up to the polymerization stage (II). More specifically, the average particle diameter was determined by measuring 546 nm-light scattered from the polymer latex with the use of Ratio Beam Spectrophotometer U-5100 manufactured by Hitachi High-Technologies Corporation.

(Polymerization Conversion Ratio)

The polymerization conversion ratio of a polymer obtained by polymerization was determined in the following manner. A sample containing a polymer (polymer latex) was obtained from a polymerization system, and about 2 g of the sample was weighed. The thus obtained sample was dried at 120° C. for 1 hour in a hot-air dryer, and was then accurately weighed to determine the weight of solid matter. Then, the ratio between the results of accurate measurements before and after drying was determined as the solid content of the sample. Finally, a polymerization conversion ratio was calculated by the following calculation formula using the solid content. It is to be noted that in this calculation formula, the polyfunctional monomer and the chain transfer agent were regarded as monomers charged.

Polymerization conversion ratio (%)={(total weight of raw materials charged×solid content−total weight of raw materials other than water and monomers)/weight of monomers charged}×100

(Gel Content and Graft Ratio)

First, 2 g of an obtained graft copolymer was dissolved in 50 mL of methyl ethyl ketone. Then, the solution was centrifuged at 30000 rpm for 1 hour using a centrifugal separator (CP60E manufactured by Hitachi Koki Co., Ltd.)

to be separated into an insoluble fraction and a soluble fraction (three sets of centrifugation were performed in total). A gel content and a graft ratio were calculated by the following formulas using the weight of the obtained insoluble fraction.

Gel content (%)={(weight of methyl ethyl ketone-insoluble fraction)/(weight of methyl ethyl ketone-insoluble fraction+weight of methyl ethyl ketone-soluble fraction)}×100

Graft ratio (%)={(weight of methyl ethyl ketone-insoluble fraction−weight of cross-linked structure polymer)/(weight of cross-linked structure polymer}×100

It is to be noted that the weight of a cross-linked structure polymer refers to the weight of monomers charged that constitute the cross-linked structure polymer. In the case of Examples in this description, the weight of a cross-linked structure polymer refers to the total weight of monomers charged in the polymerization stages (I) and (II).

(Evaluation of Thermal Stability)
<Weight Loss Temperature of Graft Copolymer>

The 1% weight loss temperature, 2% weight loss temperature, 3% weight loss temperature, 4% weight loss temperature, and 5% weight loss temperature of a graft copolymer were measured in the following manner. First, an obtained graft copolymer was preliminarily dried at 80° C. overnight. Then, the temperature of the preliminarily dried graft copolymer was increased from 30° C. to 465° C. at a rate of 10° C./min in a nitrogen stream with the use of EXSTAR EG/DTA7200 manufactured by SII Technology to measure the loss of weight at this time. The temperature at which the weight loss reached 1% of the initial weight is defined as 1% weight loss temperature, the temperature at which the weight loss reached 2% of the initial weight is defined as 29% weight loss temperature, the temperature at which the weight loss reached 3% of the initial weight is defined as 3% weight loss temperature, the temperature at which the weight loss reached 4% of the initial weight is defined as 4% weight loss temperature, and the temperature at which the weight loss reached 5% of the initial weight is defined as 5% weight loss temperature.

(Tensile Elongation)

A tensile test was performed in accordance with ASTM D638 using an injection-molded article (ASTM D638 Type 1) at a test speed of 5 mm/min to measure tensile elongation.

(Gardner Impact)

Gardner impact was measured in accordance with ASTM D3029-GB at 23° C. using a flat plate sample (thickness: 2 mm, 12 cm×12 cm) obtained by injection molding, which will be described later, and a 1.7 kg weight. It is to be noted that when the Gardner impact of a molded article having a very low strength, such as a molded article made of only an acrylic resin and containing no graft copolymer, was measured, a 0.2 kg weight was used.

(Izod Test)

In Examples 1 and 2 and Comparative Examples 1 and 2, an Izod test was performed in accordance with ASTM D-256 (temperature: 23° C., humidity: 50%). It is to be noted that an ASTM D638 Type 1 test piece (dumbbell-shaped test piece) with V notch was cut out and used as a test piece.

In Examples 3 to 5 and Comparative Examples 3 to 9, an Izod test was performed in accordance with JIS K 7110 (temperature: 23° C., humidity: 50%). It is to be noted that an ISO 179 Type 1 test piece was used.

(Total Light Transmittance and Haze Value)

The total light transmittance and haze value (Haze) of a resin composition (molded article) or a film were measured by a method described in JIS K7105 with the use of NDH-300A manufactured by NIPPON DENSHOKU INDUSTRIES CO., LTD. It is to be noted that only in Examples 3 to 5 and Comparative Examples 3 to 9, the total light transmittance and the haze value were measured by a method described in JIS K7105 with the use of NDH4000 manufactured by NIPPON DENSHOKU INDUSTRIES CO. LTD as a measuring instrument.

An inner haze value was measured in the same manner as described above except that a film was placed in a quartz cell containing pure water. That is, the difference is whether measurement is performed in air or in water.

(Transparent YI (Yellowness Index))

As a color meter in accordance with JIS Z8722, ZE-2000 manufactured by NIPPON DENSHOKU INDUSTRIES CO., LTD. was used in Examples 1 and 2 and Comparative Examples 1 and 2, and ZE-6000 manufactured by NIPPON DENSHOKU INDUSTRIES CO., LTD. was used in Examples 3 to 5 and Comparative Example 3 to 9.

(Melt Flow Rate (MFR))

In Examples 1 and 2 and Comparative Examples 1 and 2, a melt flow rate was measured in accordance with ASTM D1238 at a test temperature of 260° C. and a load of 5 kg. In Examples 3 to 5 and Comparative Examples 3 to 9, a melt flow rate was measured in accordance with ASTM D1238 at a test temperature of 230° C. and a load of 3.8 kg.

(HDT)

In Examples 1 and 2 and Comparative Examples 1 and 2, a deflection temperature under load was measured in accordance with ASTM 1648 at a load of 0.45 MPa. In Examples 3 to 5 and Comparative Examples 3 to 9, a deflection temperature under load was measured in accordance with ASTM D648 at a load of 1.82 MPa.

(Glass Transition Temperature)

The temperature of a sample was once raised to 200° C. at a rate of 25° C./min using a differential scanning calorimeter (DSC) SSC-5200 manufactured by Seiko Instruments Inc., held at 200° C. for 10 minutes, and reduced to 50° C. at a rate of 25° C./min for preliminary adjustment. Then, the DSC curve of the sample was measured while the temperature of the sample was increased to 200° C. at a temperature increase rate of 10° C./min. The integral of the obtained DSC curve was determined (DDSC), and a glass transition temperature was determined from its maximum point.

(Imidization Ratio)

An imidization ratio was calculated in the following manner using IR. Pellets of a product were dissolved in methylene chloride to obtain a solution, and the IR spectrum of the solution was measured at room temperature using TravelIR manufactured by SensIR Tecnologies. From the obtained IR spectrum, the absorption intensity of ester carbonyl groups at 1720 cm$^{-1}$ (Absester) and the absorption intensity of imide carbonyl groups at 1660 cm$^{-1}$ (Absimide) were determined, and the ratio between them was determined as an imidization ratio (Im % (IR)). Here, the term "imidization ratio" refers to the ratio of imide carbonyl groups to the total carbonyl groups.

(Glutarimide Unit Content)

A resin was subjected to $^1$H-NMR analysis using $^1$H-NMR BRUKER AvanceIII (400 MHz) to determine the amount of each monomer unit, such as a glutarimide unit or an ester unit, contained in the resin (mol %), and the monomer unit content (mol %) was converted to a monomer unit content (wt %) using the molecular weight of each monomer unit.

(Acid Value)

First, 0.3 g of an obtained glutarimide acrylic resin was dissolved in a mixed solvent of 37.5 mL of methylene chloride and 37.5 mL of methanol. Then, 2 drops of a phenolphthalein ethanol solution were added, and then 5 mL of a 0.1 N aqueous sodium hydroxide solution was added. The excess base was titrated with 0.1 N hydrochloric acid, and a difference between the amount of the base added and the amount of hydrochloric acid used for neutralization expressed in milliequivalent was determined as an acid value.

(Refractive Index)

A glutarimide acrylic resin to be measured was processed into a sheet, and the refractive index (nD) of the sheet was measured at a sodium D-line wavelength in accordance with JIS K7142 using an Abbe refractometer 2T manufactured by ATAGO CO., LTD.

(Preparation of Biaxially-Stretched Film)

A 13.3 cm×13.3 cm test piece was cut out from an unstretched raw film having a film thickness of 160 μm obtained in each of Examples and Comparative Examples, and was held for 5 minutes at a temperature higher by 20° C. than its glass transition temperature in a state where all the four sides thereof were held. Then, the test piece was stretched twice (also referred to as "stretched 100%") in two axial directions at the same time at a rate of 120 mm/min to obtain a stretched film having a film thickness of 40 μm. Then, the obtained stretched film was cooled to 23° C., and a sample was taken from the central portion of the stretched film. The birefringence (orientation birefringence) of the sample was measured using an automatic birefringence meter (KOBRA-WR manufactured by Oji Scientific Instruments) at a temperature of 23±2° C., a humidity of 50±5%, a wavelength of 590 nm, and an incident angle of 0°. At the same time, the in-plane phase difference Re and the thickness-direction phase difference Rth (incident angle: 40°) of the stretched film were also measured. (The in-plane phase difference Re and the thickness-direction phase difference Rth will be described in detail later). Further, the total light transmittance and the haze of the stretched film were also measured by the method described above.

(Preparation of Uniaxially-Stretched Film)

A 11 cm×11 cm test piece was cut out from an unstretched raw film having a film thickness of 160 μm obtained in each of Examples and Comparative Examples, and was held for 2 minutes at a temperature higher by 14° C. than its glass transition temperature in a state where two sides thereof were held. Then, the test piece was stretched twice (also referred to as "stretched 100%") in one axial direction at a rate of 120 mm/min to obtain a uniaxially-stretched film (thickness: about 110 μm). Then, the obtained stretched film was cooled to 23° C., and a sample was taken from the central portion of the stretched film. The birefringence (orientation birefringence) of the sample was measured using an automatic birefringence meter (KOBRA-WR manufactured by Oji Scientific Instruments) at a temperature of 23±2° C., a humidity of 50±5%, a wavelength of 590 nm, and an incident angle of 0°. At the same time, the in-plane phase difference Re and the thickness-direction phase difference Rth (incident angle: 400) of the stretched film were also measured. (The in-plane phase difference Re and the thickness-direction phase difference Rth will be described in detail later).

(Film Thickness)

The film thickness of a film was measured using a digimatic indicator (manufactured by Mitsutoyo Corporation).

(In-Plane Phase Difference Re and Thickness-Direction Phase Difference Rth)

A 40 mm×40 mm test piece was cut out from each of biaxially-stretched films having a thickness of 40 μm and uniaxially-stretched films obtained in Examples and Comparative Examples. The in-plane phase difference Re of the test piece was measured using an automatic birefringence meter (KOBRA-WR manufactured by Oji Scientific Instruments) at a temperature of 23±2° C., a humidity of 50±5%, a wavelength of 590 nm, and an incident angle of 0°.

Three-dimensional refractive indexes nx, ny, and nz were determined from the thickness d of the test piece measured by a digimatic indicator (manufactured by Mitsutoyo Corporation), the refractive index n of the test piece measured by an Abbe refractometer (3T manufactured by ATAGO Co., Ltd.), and the in-plane phase difference Re of the test piece and the phase difference of the test piece in a direction inclined at 40°, which were measured by an automatic birefringence meter at a wavelength of 590 nm, to calculate the thickness-direction phase difference of the test piece using the formula $Rth=((nx+ny)/2-nz) \times d$.

(Evaluation of MIT)

The bending resistance of a film was measured by a method described in IS C5016 using an MIT type folding endurance tester manufactured by Toyo Seiki Seisaku-sho, Ltd. The measurement was performed under conditions of a measuring angle of 135°, a speed of 175 times/min, R=0.38, and a load of 200 g.

(Evaluation of Appearance of Film)

The appearance of a film obtained in each of Examples and Comparative Examples was visually observed and evaluated according to the following criteria:

Good: no die lines, no pit defects, no surface irregularities, and few fish-eyes were observed and Poor: die lines, pit defects, surface irregularities and many fish-eyes were observed.

Production Example 1

<Production of Graft Copolymer (B1)>

The following materials were fed into a polymerization apparatus having a capacity of 8 liters and equipped with a stirrer.

| | |
|---|---|
| Deionized water | 180 parts |
| Polyoxyethylene lauryl ether phosphoric acid | 0.004 parts |
| Boric acid | 0.5 parts |
| Sodium carbonate | 0.05 parts |
| Sodium hydroxide | 0.01 parts |

Air in the polymerization apparatus was sufficiently purged with nitrogen gas, and then the temperature in the polymerization apparatus was set to 80° C. Then, 0.03 parts of potassium persulfate was fed as a 2% aqueous solution, and then materials for use in the polymerization stage (I) shown in Table 1 were continuously added for 81 minutes. Further, polymerization was continued for 60 minutes to obtain a polymer (I). The polymerization conversion ratio was 98.3%.

Then, 0.03 parts of sodium hydroxide was added as a 2% aqueous solution, and 0.08 parts of potassium persulfate was added as a 2% aqueous solution. Then, materials for use in the polymerization stage (II) shown in Table 1 were continuously added for 150 minutes. After the completion of the addition, 0.02 parts of potassium persulfate was added as a 2% aqueous solution, and polymerization was continued for 120 minutes to obtain a polymer (I). The polymerization conversion ratio was 98.1%, and the average particle diameter was 220 nm.

Then, 0.02 parts of potassium persulfate was added as a 2% aqueous solution. Then, materials for use in the polymerization stage (III) shown in Table 1 were continuously added for 70 minutes, and polymerization was further continued for 60 minutes to obtain a graft copolymer latex. The polymerization conversion ratio was 99.6% The obtained latex was coagulated by salting out using magnesium chloride, washed with water, and dried to obtain a white powdery graft copolymer (B1).

The graft copolymer (B1) had a gel content of 82.4% and a graft ratio of 7.0%.

Production Example 2

<Production of Graft Copolymer (B2)>

The following materials were fed into a polymerization apparatus having a capacity of 8 liters and equipped with a stirrer.

| | |
|---|---|
| Deionized water | 180 parts |
| Polyoxyethylene lauryl ether phosphoric acid | 0.004 parts |
| Boric acid | 0.5 parts |
| Sodium carbonate | 0.05 parts |
| Sodium hydroxide | 0.01 parts |

Air in the polymerization apparatus was sufficiently purged with nitrogen gas, and then the temperature in the polymerization apparatus was set to 80° C. Then, 0.03 parts of potassium persulfate was fed as a 2% aqueous solution, and then materials for use in the polymerization stage (I) shown in Table 1 were continuously added for 81 minutes. Further, polymerization was continued for 60 minutes to obtain a polymer (I). The polymerization conversion ratio was 98.6%.

Then, 0.03 parts of sodium hydroxide was added as a 2% aqueous solution, and 0.08 parts of potassium persulfate was added as a 2% aqueous solution. Then, materials for use in the polymerization stage (II) shown in Table 1 were continuously added for 150 minutes. After the completion of the addition, 0.02 parts of potassium persulfate was added as a 2% aqueous solution, and polymerization was continued for 120 minutes to obtain a polymer (II). The polymerization conversion ratio was 99.3° %, and the average particle diameter was 221 nm.

Then, 0.02 parts of potassium persulfate was added as a 2% aqueous solution. Then, materials for use in the polymerization stage (III) shown in Table 1 were continuously added for 70 minutes, and polymerization was further continued for 60 minutes to obtain a graft copolymer latex. The polymerization conversion ratio was 99.7%. The obtained latex was coagulated by salting out using magnesium chloride, washed with water, and dried to obtain a white powdery graft copolymer (B2). The graft copolymer (B2) had a gel content of 81.7% and a graft ratio of 6.1%.

Production Example 3

<Production of Graft Copolymer (B3)>

The following materials were fed into a polymerization apparatus having a capacity of 8 liters and equipped with a stirrer.

| | |
|---|---|
| Deionized water | 180 parts |
| Polyoxyethylene lauryl ether phosphoric acid | 0.004 parts |
| Boric acid | 0.5 parts |
| Sodium carbonate | 0.05 parts |
| Sodium hydroxide | 0.01 parts |

Air in the polymerization apparatus was sufficiently purged with nitrogen gas, and then the temperature in the polymerization apparatus was set to 80° C. Then, 0.03 parts of potassium persulfate was fed as a 2% aqueous solution, and then materials for use in the polymerization stage (I) shown in Table 1 were continuously added for 81 minutes. Further, polymerization was continued for 60 minutes to obtain a polymer (I). The polymerization conversion ratio was 99.3%.

Then, 0.03 parts of sodium hydroxide was added as a 2% aqueous solution, and 0.08 parts of potassium persulfate was added as a 2% aqueous solution. Then, materials for use in the polymerization stage (II) shown in Table 1 were continuously added for 150 minutes. After the completion of the addition, 0.02 parts of potassium persulfate was added as a 2% aqueous solution, and polymerization was continued for 120 minutes to obtain a polymer (II). The polymerization conversion ratio was 98.4%, and the average particle diameter was 221 nm.

Then, 0.02 parts of potassium persulfate was added as a 2% aqueous solution. Then, materials for use in the polymerization stage (III) shown in Table 1 were continuously added for 70 minutes, and polymerization was further continued for 60 minutes to obtain a graft copolymer latex. The polymerization conversion ratio was 99.8% The obtained latex was coagulated by salting out using magnesium chloride, washed with water, and dried to obtain a white powdery graft copolymer (B3). The graft copolymer (B3) had a gel content of 78.6% and a graft ratio of 2.1%.

Production Example 4

<Production of Graft Copolymer (B4)>

The following materials were fed into a polymerization apparatus having a capacity of 8 liters and equipped with a stirrer.

| | |
|---|---|
| Deionized water | 175 parts |
| Polyoxyethylene lauryl ether phosphoric acid | 0.01 parts |
| Boric acid | 0.5 parts |
| Sodium carbonate | 0.05 parts |

Air in the polymerization apparatus was sufficiently purged with nitrogen gas, and then the temperature in the polymerization apparatus was set to 80° C. Then, 26° %, of materials for use in the polymerization stage (I) shown in Table 1 were added to the polymerization apparatus at a time. Then, 0.06 parts of sodium formaldehyde sulfoxylate, 0.006 parts of disodium ethylenediamine tetraacetate, 0.001 parts of ferrous sulfate, and 0.02 parts of t-butyl hydroperoxide were added. After 15 minutes, 0.03 parts of t-butyl hydroperoxide was added, and polymerization was further continued for 15 minutes. Then, 0.01 parts of sodium hydroxide was added as a 2% aqueous solution, 0.09 parts of polyoxyethylene lauryl ether phosphoric acid was added, and the remaining 74% of the materials for use in the polymerization stage (I) were continuously added for 60 minutes. After 30 minutes from the completion of addition, 0.07 parts of t-butyl hydroperoxide was added, and polymerization was further continued for 30 minutes to obtain a polymer (1). The polymerization conversion ratio was 100.0%.

Then, 0.03 parts of sodium hydroxide was added as a 2% aqueous solution, and 0.08 parts of potassium persulfate was added as a 2% aqueous solution. Then, materials for use in the polymerization stage (II) shown in Table 1 were continuously added for 150 minutes. After the completion of addition, 0.02 parts of potassium persulfate was added as a 2% aqueous solution, and polymerization was continued for 120 minutes to obtain a polymer (II). The polymerization conversion ratio was 99.0%, and the average particle diameter was 225 nm.

Then, 0.02 parts of potassium persulfate was added as a 2%6 aqueous solution. Then, materials for use in the polymerization stage (III-1) shown in Table 1 were continuously added for 45 minutes, and polymerization was further continued for 30 minutes.

Then, materials for use in the polymerization stage (III-2) shown in Table 1 were continuously added for 25 minutes, and polymerization was further continued for 60 minutes to obtain a graft copolymer latex. The polymerization conversion ratio was 100.0%. The obtained latex was coagulated by salting out using magnesium chloride, washed with water, and dried to obtain a white powdery graft copolymer (B4). The graft copolymer (B4) had a gel content of 93.7% and a graft ratio of 21.7%.

Production Example 5

<Production of Graft Copolymer (B5)>
The following materials were fed into a polymerization apparatus having a capacity of 8 liters and equipped with a stirrer.

| Deionized water | 180 parts |
| Polyoxyethylene lauryl ether phosphoric acid | 0.004 parts |
| Boric acid | 0.5 parts |
| Sodium carbonate | 0.05 parts |
| Sodium hydroxide | 0.01 parts |

Air in the polymerization apparatus was sufficiently purged with nitrogen gas, and then the temperature in the polymerization apparatus was set to 80° C. Then, 0.03 parts of potassium persulfate was fed as a 2% aqueous solution, and then materials for use in the polymerization stage (I) shown in Table 1 were continuously added for 81 minutes. Further, polymerization was continued for 60 minutes to obtain a polymer (I). The polymerization conversion ratio was 99.9%.

Then, 0.03 parts of sodium hydroxide was added as a 2% aqueous solution, and 0.08 parts of potassium persulfate was added as a 2% aqueous solution. Then, materials for use in the polymerization stage (II) shown in Table 1 were continuously added for 150 minutes. After the completion of the addition, 0.02 parts of potassium persulfate was added as a 2% aqueous solution, and polymerization was continued for 120 minutes to obtain a polymer (II). The polymerization conversion ratio was 99.9°, and the average particle diameter was 247.9 nm.

Then, 0.02 parts of potassium persulfate was added as a 2% aqueous solution. Then, materials for use in the polymerization stage (III) shown in Table 1 were continuously added for 70 minutes, and polymerization was further continued for 60 minutes to obtain a graft copolymer latex. The polymerization conversion ratio was 99.9% The obtained latex was coagulated by salting out using magnesium chloride, washed with water, and dried to obtain a white powdery graft copolymer (B5). The graft copolymer (B5) had a gel content of 84.3% and a graft ratio of 9.5%.

Production Example 6

<Production of Graft Copolymer (B6)>
The following materials were fed into a polymerization apparatus having a capacity of 8 liters and equipped with a stirrer.

| Deionized water | 180 parts |
| Polyoxyethylene lauryl ether phosphoric acid | 0.004 parts |
| Boric acid | 0.5 parts |
| Sodium carbonate | 0.05 parts |
| Sodium hydroxide | 0.01 parts |

Air in the polymerization apparatus was sufficiently purged with nitrogen gas, and then the temperature in the polymerization apparatus was set to 80° C. Then, 0.03 parts of potassium persulfate was fed as a 2% aqueous solution, and then materials for use in the polymerization stage (I) shown in Table 1 were continuously added for 81 minutes. Further, polymerization was continued for 60 minutes to obtain a polymer (I). The polymerization conversion ratio was 97.6%.

Then, 0.03 parts of sodium hydroxide was added as a 2% aqueous solution, and 0.08 parts of potassium persulfate was added as a 2% aqueous solution. Then, materials for use in the polymerization stage (II) shown in Table 1 were continuously added for 150 minutes. After the completion of the addition, 0.02 parts of potassium persulfate was added as a 2% aqueous solution, and polymerization was continued for 120 minutes to obtain a polymer (II). The polymerization conversion ratio was 98.5° %, and the average particle diameter was 259.1 nm.

Then, 0.02 parts of potassium persulfate was added as a 2% aqueous solution. Then, materials for use in the polymerization stage (III) shown in Table 1 were continuously added for 70 minutes, and polymerization was further continued for 60 minutes to obtain a graft copolymer latex. The polymerization conversion ratio was 99.9%. The obtained latex was coagulated by salting out using magnesium chloride, washed with water, and dried to obtain a white powdery graft copolymer (B6). The graft copolymer (B6) had a gel content of 81.8° % and a graft ratio of 6.2%.

Production Example 7

<Production of Graft Copolymer (B7)>
The following materials were fed into a polymerization apparatus having a capacity of 8 liters and equipped with a stirrer.

| Deionized water | 180 parts |
| Polyoxyethylene lauryl ether phosphoric acid | 0.004 parts |
| Boric acid | 0.5 parts |
| Sodium carbonate | 0.05 parts |
| Sodium hydroxide | 0.01 parts |

Air in the polymerization apparatus was sufficiently purged with nitrogen gas, and then the temperature in the polymerization apparatus was set to 80° C. Then, 0.03 parts of potassium persulfate was fed as a 2% aqueous solution, and then materials for use in the polymerization stage (I)

shown in Table 1 were continuously added for 81 minutes. Further, polymerization was continued for 60 minutes to obtain a polymer (I). The polymerization conversion ratio was 98.4%.

Then, 0.03 parts of sodium hydroxide was added as a 2% aqueous solution, and 0.08 parts of potassium persulfate was added as a 2% aqueous solution. Then, materials for use in the polymerization stage (II) shown in Table 1 were continuously added for 150 minutes. After the completion of the addition, 0.02 parts of potassium persulfate was added as a 2% aqueous solution, and polymerization was continued for 120 minutes to obtain a polymer (II). The polymerization conversion ratio was 99.2%, and the average particle diameter was 252.0 nm.

Then, 0.02 parts of potassium persulfate was added as a 2% aqueous solution. Then, materials for use in the polymerization stage (III-1) shown in Table 1 were continuously added for 45 minutes, and polymerization was further continued for 30 minutes.

Then, materials for use in the polymerization stage (III-2) shown in Table 1 were continuously added for 25 minutes, and polymerization was further continued for 60 minutes to obtain a graft copolymer latex. The polymerization conversion ratio was 99.3%. The obtained latex was coagulated by salting out using magnesium chloride, washed with water, and dried to obtain a white powdery graft copolymer (B7). The graft copolymer (B7) had a gel content of 84.5% and a graft ratio of 9.7%.

Production Example 8

<Production of Graft Copolymer (B8)>
The following materials were fed into a polymerization apparatus having a capacity of 8 liters and equipped with a stirrer.

| | |
|---|---|
| Deionized water | 180 parts |
| Polyoxyethylene lauryl ether phosphoric acid | 0.004 parts |
| Boric acid | 0.5 parts |
| Sodium carbonate | 0.05 parts |
| Sodium hydroxide | 0.01 parts |

Air in the polymerization apparatus was sufficiently purged with nitrogen gas, and then the temperature in the polymerization apparatus was set to 80° C. Then, 0.03 parts of potassium persulfate was fed as a 2% aqueous solution, and then materials for use in the polymerization stage (I) shown in Table 1 were continuously added for 81 minutes. Further, polymerization was continued for 60 minutes to obtain a polymer (I). The polymerization conversion ratio was 98.6%.

Then, 0.03 parts of sodium hydroxide was added as a 2% aqueous solution, and 0.08 parts of potassium persulfate was added as a 2% aqueous solution. Then, materials for use in the polymerization stage (II) shown in Table 1 were continuously added for 150 minutes. After the completion of the addition, 0.02 parts of potassium persulfate was added as a 2% aqueous solution, and polymerization was continued for 120 minutes to obtain a polymer (II). The polymerization conversion ratio was 98.0%, and the average particle diameter was 256.4 nm.

Then, 0.02 parts of potassium persulfate was added as a 2% aqueous solution. Then, materials for use in the polymerization stage (III-1) shown in Table 1 were continuously added for 45 minutes, and polymerization was further continued for 30 minutes.

Then, materials for use in the polymerization stage (II-2) shown in Table 1 were continuously added for 25 minutes, and polymerization was further continued for 60 minutes to obtain a graft copolymer latex. The polymerization conversion ratio was 99.2%. The obtained latex was coagulated by salting out using magnesium chloride, washed with water, and dried to obtain a white powdery graft copolymer (B8). The graft copolymer (B8) had a gel content of 83.5% and a graft ratio of 8.4%.

Production Example 9

<Production of Graft Copolymer (B9)>
The following materials were fed into a polymerization apparatus having a capacity of 8 liters and equipped with a stirrer.

| | |
|---|---|
| Deionized water | 180 parts |
| Polyoxyethylene lauryl ether phosphoric acid | 0.004 parts |
| Boric acid | 0.5 parts |
| Sodium carbonate | 0.05 parts |
| Sodium hydroxide | 0.01 parts |

Air in the polymerization apparatus was sufficiently purged with nitrogen gas, and then the temperature in the polymerization apparatus was set to 80° C. Then, 0.03 parts of potassium persulfate was fed as a 2% aqueous solution, and then materials for use in the polymerization stage (I) shown in Table 1 were continuously added for 81 minutes. Further, polymerization was continued for 60 minutes to obtain a polymer (I). The polymerization conversion ratio was 98.9%.

Then, 0.03 parts of sodium hydroxide was added as a 2% aqueous solution, and 0.08 parts of potassium persulfate was added as a 2% aqueous solution. Then, materials for use in the polymerization stage (II) shown in Table 1 were continuously added for 150 minutes. After the completion of the addition, 0.02 parts of potassium persulfate was added as a 2% aqueous solution, and polymerization was continued for 120 minutes to obtain a polymer (II). The polymerization conversion ratio was 100.0%, and the average particle diameter was 224.5 nm.

Then, 0.02 parts of potassium persulfate was added as a 2% aqueous solution. Then, materials for use in the polymerization stage (III) shown in Table 1 were continuously added for 70 minutes, and polymerization was further continued for 60 minutes to obtain a graft copolymer latex. The polymerization conversion ratio was 100.0%. The obtained latex was coagulated by salting out using magnesium chloride, washed with water, and dried to obtain a white powdery graft copolymer (B9). The graft copolymer (B9) had a gel content of 79.5% and a graft ratio of 3.2%.

Production Example 10

<Production of Graft Copolymer (B10)>
The following materials were fed into a polymerization apparatus having a capacity of 8 liters and equipped with a stirrer.

| | |
|---|---|
| Deionized water | 180 parts |
| Polyoxyethylene lauryl ether phosphoric acid | 0.004 parts |
| Boric acid | 0.5 parts |
| Sodium carbonate | 0.05 parts |
| Sodium hydroxide | 0.01 parts |

Air in the polymerization apparatus was sufficiently purged with nitrogen gas, and then the temperature in the polymerization apparatus was set to 80° C. Then, 0.03 parts of potassium persulfate was fed as a 2% aqueous solution, and then materials for use in the polymerization stage (I) shown in Table 1 were continuously added for 81 minutes. Further, polymerization was continued for 60 minutes to obtain a polymer (I). The polymerization conversion ratio was 99.4%.

Then, 0.03 parts of sodium hydroxide was added as a 2% aqueous solution, and 0.08 parts of potassium persulfate was added as a 2°% aqueous solution. Then, materials for use in the polymerization stage (II) shown in Table 1 were continuously added for 150 minutes. After the completion of the addition, 0.02 parts of potassium persulfate was added as a 2%0 aqueous solution, and polymerization was continued for 120 minutes to obtain a polymer (II). The polymerization conversion ratio was 100.0°%, and the average particle diameter was 223.6 nm.

Then, 0.02 parts of potassium persulfate was added as a 2% aqueous solution. Then, materials for use in the polymerization stage (III) shown in Table 1 were continuously added for 70 minutes, and polymerization was further continued for 60 minutes to obtain a graft copolymer latex. The polymerization conversion ratio was 100.0%. The obtained latex was coagulated by salting out using magnesium chloride, washed with water, and dried to obtain a white powdery graft copolymer (B10). The graft copolymer (B10) had a gel content of 80.4% and a graft ratio of 4.4%.

Production Example 11

<Production of Graft Copolymer (B11)>
The following materials were fed into a polymerization apparatus having a capacity of 8 liters and equipped with a stirrer.

| | |
|---|---|
| Deionized water | 180 parts |
| Polyoxyethylene lauryl ether phosphoric acid | 0.004 parts |
| Boric acid | 0.5 parts |
| Sodium carbonate | 0.05 parts |
| Sodium hydroxide | 0.01 parts |

Air in the polymerization apparatus was sufficiently purged with nitrogen gas, and then the temperature in the polymerization apparatus was set to 80° C. Then, 0.03 parts of sodium hydroxide was fed as a 2% aqueous solution, and 0.12 parts of potassium persulfate was fed as a 2% aqueous solution. Then, materials for use in the polymerization stage (II) shown in Table 1 were continuously added for 231 minutes. After the completion of the addition, 0.03 parts of potassium persulfate was added as a 2% aqueous solution, and polymerization was continued for 120 minutes to obtain a polymer (II). The polymerization conversion ratio was 100.0%, and the average particle diameter was 228.6 nm.

Then, 0.02 parts of potassium persulfate was added as a 2% aqueous solution. Then, materials for use in the polymerization stage (III) shown in Table 1 were continuously added for 70 minutes, and polymerization was further continued for 60 minutes to obtain a graft copolymer latex. The polymerization conversion ratio was 100.0%. The obtained latex was coagulated by salting out using magnesium chloride, washed with water, and dried to obtain a white powdery graft copolymer (B11).

The graft copolymer (B1) had a gel content of 97.0% and a graft ratio of 26.0%.

Production Example 12

<Production of Graft Copolymer (B12)>
The following materials were fed into a polymerization apparatus having a capacity of 8 liters and equipped with a stirrer.

| | |
|---|---|
| Deionized water | 180 parts |
| Polyoxyethylene lauryl ether phosphoric acid | 0.004 parts |
| Boric acid | 0.5 parts |
| Sodium carbonate | 0.05 parts |
| Sodium hydroxide | 0.01 parts |

Air in the polymerization apparatus was sufficiently purged with nitrogen gas, and then the temperature in the polymerization apparatus was set to 80° C. Then, 0.03 parts of potassium persulfate was fed as a 2% aqueous solution, and then materials for use in the polymerization stage (I) shown in Table 1 were continuously added for 81 minutes. Further, polymerization was continued for 60 minutes to obtain a polymer (I). The polymerization conversion ratio was 99.5%.

Then, 0.03 parts of sodium hydroxide was added as a 2% aqueous solution, and 0.08 parts of potassium persulfate was added as a 2% aqueous solution. Then, materials for use in the polymerization stage (II) shown in Table 1 were continuously added for 150 minutes. After the completion of the addition, 0.02 parts of potassium persulfate was added as a 2% aqueous solution, and polymerization was continued for 120 minutes to obtain a polymer (II). The polymerization conversion ratio was 100.0%, and the average particle diameter was 225.5 nm.

Then, 0.02 parts of potassium persulfate was added as a 2% aqueous solution. Then, materials for use in the polymerization stage (III) shown in Table 1 were continuously added for 70 minutes, and polymerization was further continued for 60 minutes to obtain a graft copolymer latex. The polymerization conversion ratio was 100.0%. The obtained latex was coagulated by salting out using magnesium chloride, washed with water, and dried to obtain a white powdery graft copolymer (B12). The graft copolymer (B12) had a gel content of 81.8% and a graft ratio of 62%.

Production Example 13

<Production of Graft Copolymer (B13)>
The following materials were fed into a polymerization apparatus having a capacity of 8 liters and equipped with a stirrer.

| | |
|---|---|
| Deionized water | 200 parts |
| Sodium polyoxyethylene lauryl ether phosphate | 0.004 parts |
| Sodium formaldehyde sulfoxylate | 0.11 parts |
| Disodium ethylenediaminetetraacetate | 0.001 parts |

Air in the polymerization apparatus was sufficiently purged with nitrogen gas, and then the temperature in the polymerization apparatus was set to 40° C. Then, a mixture of 0.04 parts of cumene hydroperoxide and materials for use in the polymerization stage (II) shown in Table 1 was continuously added for 135 minutes. Polymerization was further continued for 60 minutes to obtain a polymer (II). The polymerization conversion ratio was 99.5%, and the average particle diameter was 120 nm.

Then, the temperature in the polymerization apparatus was set to 60° C., and a mixture of 0.3 parts of cumene hydroperoxide and materials for use in the polymerization stage (III) shown in Table 1 was continuously added for 165 minutes, and polymerization was further continued for 60 minutes to obtain a graft copolymer latex. The polymerization conversion ratio was 100.0%. The obtained latex was coagulated by salting out using magnesium sulfate, washed with water, and dried to obtain a white powdery graft copolymer (B13). The graft copolymer (B13) had a gel content of 74.9% and a graft ratio of 66.4%.

TABLE 1

| | Graft copolymer (B) | B1 | B2 | B3 | B4 | B5 | B6 | B7 |
|---|---|---|---|---|---|---|---|---|
| Polymerization stage (I) | Amount of monomer mixture (a) per 100 parts of total amount of monomers of (B) (parts) | 27 | 27 | 27 | 27 | 27 | 27 | 27 |
| | Methyl methacrylate (%) | 83.6 | 83.6 | 93.2 | 97 | 60 | 60 | 60 |
| | Butyl acrylate (%) | 6 | 6 | 6 | 3 | 6 | 6 | 6 |
| | Benzyl methacrylate (%) | 10.4 | 10.4 | 0 | 0 | 34 | 34 | 34 |
| | Styrene (%) | 0 | 0 | 0.8 | 0 | 0 | 0 | 0 |
| | Amount of allyl methacrylate per 100 parts of total amount of monomers of (B) (parts) | 0.135 | 0.135 | 0.135 | 0.135 | 0.135 | 0.135 | 0.135 |
| | Amount of n-octyl mercaptan per 100 parts of total amount of monomers of (B) (parts) | 0.3 | 0.3 | 0.3 | 0 | 0.3 | 0.3 | 0.3 |
| | Amount of t-dodecyl mercaptan per 100 parts of total amount of monomers of (B) (parts) | 0 | 0 | 0 | 0.1 | 0 | 0 | 0 |
| | Amount of emulsifier per 100 parts of total amount of monomers of (B) (parts) | 0.09 | 0.09 | 0.09 | 0.09 | 0.09 | 0.09 | 0.09 |
| Polymerization stage (II) | Amount of monomer mixture (b) per 100 parts of total amount of monomers of (B) (parts) | 50 | 50 | 50 | 50 | 50 | 50 | 50 |
| | Methyl methacrylate (%) | 0 | 0 | 0 | 0 | 0 | 0 | 0 |
| | Butyl acrylate (%) | 68.2 | 68.8 | 82 | 82 | 50.6 | 46.5 | 50.6 |
| | Benzyl methacrylate (%) | 31.8 | 28.2 | 0 | 0 | 49.4 | 0 | 49.4 |
| | Benzyl acrylate (%) | 0 | 0 | 0 | 0 | 0 | 53.5 | 0 |
| | Styrene (%) | 0 | 3 | 18 | 18 | 0 | 0 | 0 |
| | Amount of allyl methacrylate per 100 parts of total amount of monomers of (B) (parts) | 0.75 | 0.75 | 0.75 | 0.75 | 0.75 | 0.75 | 0.75 |
| | Amount of emulsifier per 100 parts of total amount of monomers of (B) (parts) | 0.2 | 0.2 | 0.2 | 0.2 | 0.2 | 0.2 | 0.2 |
| Average particle diameter (nm) at the end of polymerization stage (II) | | 220 | 221 | 221 | 225 | 248 | 259 | 252 |
| Polymerization stage (III) (III-1) | Amount of monomer mixture (c-1) per 100 parts of total amount of monomers of (B) (parts) | 23 | 23 | 23 | 15 | 23 | 23 | 15 |
| | Methyl methacrylate (%) | 80 | 80 | 80 | 95 | 80 | 80 | 97.5 |
| | Butyl acrylate (%) | 20 | 20 | 20 | 5 | 20 | 20 | 2.5 |
| | Benzyl methacrylate (%) | 0 | 0 | 0 | 0 | 0 | 0 | 0 |
| | Methacrylic acid (%) | 0 | 0 | 0 | 0 | 0 | 0 | 0 |
| (III-2) | Amount of monomer mixture (c-2) per 100 parts of total amount of monomers of (B) (parts) | 0 | 0 | 0 | 8 | 0 | 0 | 8 |
| | Methyl methacrylate (%) | 0 | 0 | 0 | 52 | 0 | 0 | 76 |
| | Butyl acrylate (%) | 0 | 0 | 0 | 48 | 0 | 0 | 24 |
| Gel content (%) | | 82.4 | 81.7 | 78.6 | 93.7 | 84.3 | 81.8 | 84.5 |
| Graft ratio (%) | | 7.0 | 6.1 | 2.1 | 21.7 | 9.5 | 6.2 | 9.7 |

| | Graft copolymer (B) | B8 | B9 | B10 | B11 | B12 | B13 |
|---|---|---|---|---|---|---|---|
| Polymerization stage (I) | Amount of monomer mixture (a) per 100 parts of total amount of monomers of (B) (parts) | 27 | 27 | 27 | 0 | 27 | 0 |
| | Methyl methacrylate (%) | 60 | 83.6 | 93.2 | 0 | 83.6 | 0 |
| | Butyl acrylate (%) | 6 | 6 | 6 | 0 | 6 | 0 |
| | Benzyl methacrylate (%) | 34 | 10.4 | 0 | 0 | 10.4 | 0 |
| | Styrene (%) | 0 | 0 | 0.8 | 0 | 0 | 0 |
| | Amount of allyl methacrylate per 100 parts of total amount of monomers of (B) (parts) | 0.135 | 0.135 | 0.135 | 0 | 0.135 | 0 |
| | Amount of n-octyl mercaptan per 100 parts of total amount of monomers of (B) (parts) | 0.3 | 0.3 | 0.3 | 0 | 0.3 | 0 |
| | Amount of t-dodecyl mercaptan per 100 parts of total amount of monomers of (B) (parts) | 0 | 0 | 0 | 0 | 0 | 0 |
| | Amount of emulsifier per 100 parts of total amount of monomers of (B) (parts) | 0.09 | 0.09 | 0.09 | 0.00 | 0.09 | 0.00 |
| Polymerization stage (II) | Amount of monomer mixture (b) per 100 parts of total amount of monomers of (B) (parts) | 50 | 50 | 50 | 77 | 50 | 45 |
| | Methyl methacrylate (%) | 0 | 0 | 0 | 0 | 0 | 10 |
| | Butyl acrylate (%) | 46.5 | 82 | 68.2 | 68.2 | 68.2 | 90 |
| | Benzyl methacrylate (%) | 0 | 0 | 31.8 | 31.8 | 31.8 | 0 |
| | Benzyl acrylate (%) | 53.5 | 0 | 0 | 0 | 0 | 0 |
| | Styrene (%) | 0 | 18 | 0 | 0 | 0 | 0 |
| | Amount of allyl methacrylate per 100 parts of total amount of monomers of (B) (parts) | 0.75 | 0.75 | 0.75 | 0.75 | 0.75 | 0.225 |
| | Amount of emulsifier per 100 parts of total amount of monomers of (B) (parts) | 0.2 | 0.2 | 0.2 | 0.2 | 0.2 | 0.0 |

TABLE 1-continued

|  |  |  |  |  |  |  |  |
|---|---|---|---|---|---|---|---|
| Average particle diameter (nm) at the end of polymerization stage (II) | | 256 | 225 | 224 | 229 | 226 | 120 |
| Polymerization stage (III) | (III-1) Amount of monomer mixture (c-1) per 100 parts of total amount of monomers of (B) (parts) | 15 | 23 | 23 | 23 | 23 | 55 |
| | Methyl methacrylate (%) | 97.5 | 80 | 80 | 80 | 64.8 | 46.4 |
| | Butyl acrylate (%) | 2.5 | 20 | 20 | 20 | 20 | 4 |
| | Benzyl methacrylate (%) | 0 | 0 | 0 | 0 | 15.2 | 44.9 |
| | Methacrylic acid (%) | 0 | 0 | 0 | 0 | 0 | 4.7 |
| | (III-2) Amount of monomer mixture (c-2) per 100 parts of total amount of monomers of (B) (parts) | 8 | 0 | 0 | 0 | 0 | 0 |
| | Methyl methacrylate (%) | 76 | 0 | 0 | 0 | 0 | 0 |
| | Butyl acrylate (%) | 24 | 0 | 0 | 0 | 0 | 0 |
| Gel content (%) | | 83.5 | 79.5 | 80.4 | 97.0 | 81.8 | 74.9 |
| Graft ratio (%) | | 8.4 | 3.2 | 4.4 | 26.0 | 6.2 | 66.4 |

Emulsifier: polyoxyethylene lauryl ether phosphoric acid (Evaluation of Thermal Stability of Graft Copolymer)

The thermal stability of each of the graft copolymers (B1) to (B4) obtained in Production Examples 1 to 4 was evaluated in the above-described manner. The results are shown in Table 2.

TABLE 2

| | Weight loss temperature (° C.) | B1 | B2 | B3 | B4 |
|---|---|---|---|---|---|
| Thermal stability evaluation TGA | 1% | 281 | 275 | 273 | 238 |
| | 2% | 307 | 302 | 297 | 264 |
| | 3% | 318 | 315 | 315 | 276 |
| | 4% | 325 | 323 | 325 | 284 |
| | 5% | 330 | 329 | 332 | 291 |

Production Example 14

<Production of Glutarimide Acrylic Resin (A1)>

A glutarimide acrylic resin (A1) was produced using poly(methyl methacryalate) as a raw material resin and monomethylamine as an imidization agent.

In Production Example 14, a tandem-type reactive extruder was used, in which two extrusion reactors were arranged in series.

The tandem-type reactive extruder had a first extruder and a second extruder, and both the extruders were intermeshing co-rotating twin screw extruders having a diameter of 75 mm and an L/D ratio (ratio of length (L) to diameter (D) of extruder) of 74. The raw material resin was supplied through the raw material supply port of the first extruder using a loss-in-weight feeder (manufactured by Kubota Corporation).

The pressure in each of the vents of the first and second extruders was reduced to about −0.090 MPa. Further, the first extruder was connected to the second extruder through a pipe having a diameter of 38 mm and a length of 2 m, and a constant flow pressure valve was used as a system for controlling the pressure in a part connecting the resin discharge port of the first extruder to the raw material supply port of the second extruder.

The resin (strand) discharged from the second extruder was cooled on a cooling conveyor and cut into pellets by a pelletizer. In order to adjust the pressure in the part connecting the resin discharge port of the first extruder and the raw material supply port of the second extruder or to detect unstable extrusion, resin-pressure meters were provided at the discharge port of the first extruder, the center of the part connecting the first and second extruders, and the discharge port of the second extruder.

In the first extruder, an imide resin intermediate 1 was produced using a polymethyl methacrylate resin (Mw: 105000) as a raw material resin and monomethylamine as an imidization agent. At this time, the temperature of maximum temperature portion of the extruder was 280° C., the screw rotation speed of the extruder was 55 rpm, the supply rate of the raw material resin was 150 kg/hr, and the amount of monomethylamine added was 2.0 parts with respect to 100 parts of the raw material resin. The constant flow pressure valve was provided just before the raw material supply port of the second extruder to adjust the pressure in the monomethylamine injection portion of the first extruder to 8 MPa.

In the second extruder, the remaining imidization agent and a by-product were devolatilized through a rear vent and a vacuum vent, and then dimethyl carbonate was added as an esterification agent to produce an imide resin intermediate 2. At this time, the temperature of each barrel of the extruder was 260° C., the screw rotation speed of the extruder was 55 rpm, and the amount of dimethyl carbonate added was 3.2 parts with respect to 100 parts of the raw material resin. Further, the esterification agent was removed through a vent, and then the resin was extruded through a strand die, cooled in a water tank, and pelletized by a pelletizer to obtain a glutarimide acrylic resin (A1).

The obtained glutarimide acrylic resin (A1) is an acrylic resin obtained by copolymerization of a glutarimide unit represented by the general formula (1) and a (meth)acrylate ester unit represented by the general formula (2).

The imidization ratio, glutarimide unit content, acid value, glass transition temperature, and refractive index of the glutarimide acrylic resin (A1) were measured by the above-described methods. As a result, the glutarimide acrylic resin (A1) had an imidization ratio of 13%, a glutarimide unit content of 7 wt %, an acid value of 0.4 mmol/g, a glass transition temperature of 130° C., and a refractive index of 1.4965. Further, the methyl methacrylate content of the glutarimide acrylic resin (A1) was 93 wt %.

Production Example 15

<Production of Glutarimide Acrylic Resin (A2)>

An intermeshing co-rotating twin screw extruder (L/D=90) having a diameter of 40 mm was used as an extruder. The temperature of each temperature control zone of the extruder was set to 250 to 280° C., and the screw rotation speed of the extruder was set to 85 rpm. A polymethyl methacrylate resin (Mw: 105000) was supplied at 42.4 kg/hr and melted in a kneading block so that the kneading block was filled with the resin. Then, 7.5 parts by weight of monomethylamine (manufactured by MITSUBISHI GAS CHEMICAL COMPANY, INC.) per 100 parts by weight of the polymethyl methacylate resin was injected through a nozzle. A reverse flight was placed at the end of a reaction zone to fill the reaction zone with the resin. By-products produced by a reaction and excess methylamine were removed by reducing the pressure of a vent port to −0.092 MPa. The resin extruded as a strand through a die provided at the outlet of the extruder was cooled in a water tank and then pelletized by a pelletizer to obtain a resin (I). Then, the temperature of each temperature control zone of the intermeshing co-rotating twin screw extruder having a diameter of 40 mm was set to 240 to 260° C., and the screw rotation speed of the extruder was set to 72 rpm. The resin (1) was supplied through a hopper at 41 kg/hr and melted in the kneading block so that the kneading block was filled with the resin (I). Then, 0.3 parts by weight of dimethyl carbonate per 100 parts by weight of the polymethyl methacrylate resin was injected through the nozzle to reduce carboxyl groups in the resin. A reverse flight was placed at the end of a reaction zone to fill the reaction zone with the resin. By-products produced by a reaction and excess dimethyl carbonate were removed by reducing the pressure of the vent port to −0.092 MPa. The resin extruded as a strand through the die provided at the outlet of the extruder was cooled in a water tank and then pelletized by a pelletizer to obtain a glutarimide acrylic resin. The imidization ratio, glutarimide unit content, glass transition temperature, and refractive index of the glutarimide acrylic resin were measured by the above-described methods. As a result, the glutarimide acrylic resin had an imidization ratio of 20 mol %, a glutarimide content of 29 wt %, a glass transition temperature of 129.2° C., and a refractive index of 1.51.

Then, 20 parts by weight of RESISFY R100 (refractive index: 1.56, glass transition temperature: 129.3° C., styrene/methyl methacrylate/maleic anhydride=74 wt %/15 wt %/11 wt %) manufactured by Denka Company Limited was added per 100 parts by weight of the glutarimide acrylic resin produced by the above method to obtain a mixture as a glutarimide acrylic resin (A2). The methyl methacrylate content of the glutarimide acrylic resin (A2) was 71.7 wt %.

Examples 1 and 2, Comparative Examples 1 and 2

<Preparation of Molded Article>

Each of the graft copolymers (B1), (B2), and (B4) obtained in Production Examples 1, 2, and 4 and the acrylic resin (A1) obtained in Production Example 14 were extrusion kneaded at a ratio shown in Table 3 using a vent-equipped single screw extruder (HW-40-28: 40 m/m, L/D=28, manufactured by TABATA Industrial Machinery Co., Ltd.) at a preset temperature of C1 to C3 of 210° C., a preset temperature of C4 of 220° C., a preset temperature of C5 of 230° C., and a preset temperature of D of 240° C., and pelletized to obtain pellets.

The obtained pellets were dried at 90° C. for 3 hours or longer and then subjected to injection molding using an injection molding machine (FN1000 manufactured by NISSEI PLASTIC INDUSTRIAL CO., LTD.) at a cylinder temperature T3 of 230° C., a cylinder temperature T2 of 240° C., and a cylinder temperature T1 of 255° C., a nozzle temperature N of 255° C., an injection speed of 20%, and a mold temperature of 60° C. to obtain a flat plate sample having a thickness of 2 mm and a size of 12 cm×12 cm. The total light transmittance, haze, and transparent YI of the obtained flat plate sample were measured as indicators of transparency and color, and the Gardner impact of the flat plate sample was also measured.

Further, ¼-inch test pieces and ASTM D638 Type I test pieces (dumbbell-shaped test pieces) were prepared at the same injection molding temperature. The ¼-inch test pieces were used to measure HDT, and the ASTM D638 Type I test pieces were used to measure impact resistance (Izod) and to perform a tensile test. The results are shown in Table 3. Further the MFR was also measured using the pellets.

(Phase Difference Measurement Using Injection-Molded Flat Plate Sample)

A crossed Nicols test was performed using the obtained flat plate sample (thickness: 2 mm, 12 cm×12 cm), and the maximum phase difference of the flat plate sample was measured by phase-contrast imaging. The results are shown in Table 3.

(Crossed Nicols Test)

A crossed Nicols test was performed in which the flat plate sample (in Examples 1 and 2 and Comparative Examples 1 and 2, the flat plate sample had a thickness of 2 mm and a size of 12 cm×12 cm, and in Examples 3 to 5 and Comparative Examples 3 to 9, the flat plate sample had a thickness of 2 mm and a size of 10 cm×15 cm) was placed between two polarizers perpendicular to each other to determine whether or not transmitted light was visually observed (i.e., to determine the presence or absence of light leakage). The result of the crossed Nicols test was evaluated according to the following criteria. The resin is likely to be oriented particularly in a near-gate area so that light leakage resulting from phase difference is likely to occur in the near-gate area. Therefore, the photographs of near-gate areas of the samples of Examples 1 and 2 and Comparative Examples 1 and 2 are shown in FIGS. 1 to 4.

A: Light leakage was not observed or was hardly observed (light leakage was at a level shown in FIG. 1).

B: Light leakage was partially observed (light leakage was at a level show in FIG. 2 or 3).

C: Light leakage was entirely observed (light leakage was at a level shown in FIG. 4).

(Maximum Phase Difference Measured by Phase-Contrast Imaging)

The phase difference of the flat plate sample (thickness: 2 mm, 12 cm×12 cm) was measured using WPA-200 (manufactured by Photonic Lattice. Inc.). The maximum phase difference of the flat plate sample is shown in Table 3.

TABLE 3

| | Acrylic resin | Graft copolymer | Tensile elongation (%) | Izod (J/m) | Gardner impact (kg · cm) | Crossed Nicols test | Maximum phase difference (nm) | Total light transmittance (%) | Haze (%) | Transparent YI | MFR (g/10 min) | HDT (° C.) |
|---|---|---|---|---|---|---|---|---|---|---|---|---|
| Example 1 | A1 (60%) | B1 (40%) | 45.5 | 46.0 | 140.3 | A | 25 | 91.7 | 1.47 | 2.18 | 9.2 | 101.5 |
| Example 2 | A1 (60%) | B2 (40%) | 49.7 | 48.0 | 130.0 | B | 70 | 91.8 | 1.41 | 2.43 | 9.1 | 102.0 |
| Comparative Example 1 | A1 (100%) | — | 5.4 | 27.5 | 3.2 | B | 43 | 91.9 | 0.71 | 2.14 | 20.4 | 111.2 |
| Comparative Example 2 | A1 (60%) | B4 (40%) | 40.1 | 58.8 | 141.0 | C | 502 | 84.9 | 9.6 | 9.53 | 4.3 | 104.3 |

The molded articles obtained in Examples 1 and 2 have a lower haze value and a lower transparent YI value than the molded article obtained in Comparative Example 2, which shows that the molded articles obtained in Examples 1 and 2 are excellent in color. Further the Izod value and the Gardner impact value, which are indicators of impact resistance, of the molded articles obtained in Examples 1 and 2 are high, which shows that the molded articles obtained in Examples 1 and 2 have excellent impact resistance. Further, the molded articles obtained in Examples 1 and 2 hardly cause light leakage in the crossed Nicols test, have a small maximum phase difference, and are excellent in optical isotropy. Particularly, the molded article obtained in Example 1 offers the most excellent balance of impact resistance, color, and optical isotropy.

Examples 3 to 5, Comparative Examples 3 to 9

<Preparation of Molded Article>

An acrylic resin (A) and a graft copolymer (B) shown in Table 4 were extrusion kneaded at a ratio shown in Table 4 using a vent-equipped single screw extruder (HW-40-28: 40 m/m, L/D=28, manufactured by TABATA Industrial Machinery Co., Ltd.) at a preset temperature of C1 to C3 of 200° C., a preset temperature of C4 of 210° C., a preset temperature of C5 of 220° C., and a preset temperature of D of 230° C., and pelletized to obtain pellets. It is to be noted that in Comparative Example 9, ACRYPET VH-001 manufactured by MITSUBISHI RAYON CO., LTD. was used as an acrylic resin (A3).

The obtained pellets were dried at 90° C. for 3 hours or longer and then subjected to injection molding using an injection molding machine (160MSP-10 manufactured by Mitsubishi Heavy Industries, Ltd.) at a cylinder temperature T3 of 255° C., a cylinder temperature T2 of 265° C., and a cylinder temperature T1 of 275° C., a nozzle temperature N of 280° C., an injection speed of 20%, and a mold temperature of 70° C. to obtain a flat plate sample having a thickness of 2 mm and a size of 10 cm×15 cm. The total light transmittance, haze, and transparent YI of the obtained flat plate sample were measured as indicators of transparency and color, and the Gardner impact of the flat plate sample was also measured.

Further, ISO 179 Type I test pieces, ¼-inch test pieces, and ASTM D638 Type I test pieces (dumbbell-shaped test pieces) were prepared at the same injection molding temperature. The ISO 179 Type I test pieces were used to measure impact resistance (Izod), the ¼-inch test pieces were used to measure HDT, and the ASTM D638 Type I test pieces were used to perform a tensile test. The results are shown in Table 4. Further, the MFR was also measured using the pellets.

A crossed Nicols test was performed using the obtained flat plate sample (thickness: 2 mm, 10 cm×15 cm) in the same manner as described above. The results are shown in Table 4.

TABLE 4

| | Acrylic resin | Graft copolymer | Tensile elongation (%) | Izod (kJ/m2)) | Gardner impact (kg · cm) | Crossed Nicols test | Total light transmittance (%) | Haze (%) | Transparent YI | MFR@3.8 kg (g/10 min) | HDT (° C.) |
|---|---|---|---|---|---|---|---|---|---|---|---|
| Example 3 | A1 (60%) | B1 (40%) | 67.2 | 4.3 | 129.5 | A | 91.7 | 0.62 | 0.78 | 1.0 | 106.4 |
| Example 4 | A1 (60%) | B10 (40%) | 67.3 | 4.8 | 136.1 | A | 90.63 | 1.28 | 0.82 | 0.9 | 106.6 |
| Example 5 | A1 (60%) | B11 (40%) | 78.4 | 5.9 | 128.3 | A | 91.13 | 1.15 | 1.3 | 0.5 | 107.8 |
| Comparative Example 3 | A1 (100%) | — | | 4.1 | 2.0 | A | 91.8 | 0.45 | 1.53 | 1.8 | 117.4 |
| Comparative Example 4 | A1 (60%) | B9 (40%) | 67.2 | 5.9 | 156.1 | C | 85.45 | 5.67 | 5.43 | 0.9 | 104.8 |
| Comparative Example 5 | A1 (60%) | B12 (40%) | 65.7 | 4.1 | 100.8 | A | 91.38 | 1.19 | 6.13 | 1.1 | 107.0 |
| Comparative Example 6 | A1 (60%) | B3 (40%) | 67.3 | 6.5 | 184.3 | C | 85.1 | 6.21 | 6.23 | 0.9 | 105.9 |
| Comparative Example 7 | A1 (60%) | B4 (40%) | 89.8 | 6.7 | 232.4 | C | 82.75 | 8.87 | 10.7 | 0.5 | 105.8 |
| Comparative Example 8 | A1 (65%) | B13 (35%) | 70.8 | 3.8 | 18.1 | B | 78.87 | 10.28 | 31.56 | 1.4 | 106.6 |
| Comparative Example 9 | A3 (100%) | — | | 7.8 | 2 | 3.0 | B | 92.31 | 0.39 | 0.51 | 1.8 | 107.2 |

The molded articles obtained in Examples 3 to 5 have a lower haze value and a lower transparent YI value than the molded articles obtained in Comparative Examples 4 to 8, which shows that the molded articles obtained in Examples 3 to 5 are excellent in color. Further, the Izod value and the Gardner impact value, which are indicators of impact resistance, of the molded articles obtained in Examples 3 to 5 are high, which shows that the molded articles obtained in Examples 3 to 5 have excellent impact resistance. Further, the molded articles obtained in Examples 3 to 5 hardly cause light leakage in the crossed Nicols test and are excellent also in optical isotropy.

Examples 6 to 13, Comparative Examples 10 to 14

A single screw extruder having a full-flight screw with a diameter of 40 mm was used, and the temperature of temperature control zone of the extruder was set to 255° C., and the screw rotation speed of the extruder was set to 52 rpm. A mixture of an acrylic resin (A) and a graft copolymer (B) shown in Table 5 or 6 was supplied at a rate of 10 kg/hr. A resin composition extruded as a strand through a die provided at the outlet of the extruder was cooled in a water tank and pelletized by a pelletizer to obtain pellets.

The obtained pellets were supplied at a rate of 10 kg/hr to a single screw extruder equipped with a leaf disc filter having an opening size of 5 μm and a T-die connected to the outlet thereof. The temperature of temperature control zone of the extruder was set to 260° C., and the screw rotation speed of the extruder was set to 20 rpm. The pellets were melt extruded through the extruder to obtain a film having a film thickness of 160 μm. A biaxially-stretched film and a uniaxially-stretched film were produced from the obtained film in accordance with the above-described biaxially-stretched film production method and the above-described uniaxially-stretched film production method, respectively. The physical properties of these stretched films were measured by the above-described methods and evaluated.

| Deionized water | 190 parts |
|---|---|
| Boric acid | 0.6 parts |
| Sodium carbonate | 0.06 parts |

TABLE 5

| | | | Example 6 | Example 7 | Example 8 | Example 9 | Comparative example 10 | Comparative example 11 | Comparative example 12 | Comparative example 13 |
|---|---|---|---|---|---|---|---|---|---|---|
| Acrylic resin (A) | | Type | A1 | A1 | A1 | A1 | A1 | A1 | A1 | A1 |
| | | (parts) | 85 | 85 | 85 | 85 | 85 | 100 | 85 | 85 |
| Graft copolymer (B) | | Type | B1 | B2 | B10 | B11 | B3 | — | B9 | B12 |
| | | (parts) | 15 | 15 | 15 | 15 | 15 | — | 15 | 15 |
| Physical properties of biaxially-stretched film | Film thickness | (μm) | 40 | 40 | 40 | 40 | 40 | 40 | 40 | 40 |
| | Glass transition temperature (DSC) | (° C.) | 122 | 122 | 122 | 122 | 122 | 122 | 122 | 122 |
| | Total light transmittance | (%) | 92.4 | 92.4 | 92.5 | 92.6 | 92.4 | 92.4 | 92.5 | 92.5 |
| | Haze value | (%) | 0.9 | 0.77 | 0.73 | 0.93 | 0.59 | 0.21 | 1.03 | 1.8 |
| | Inner haze value | (%) | 0.1 | 0.13 | 0.07 | 0.15 | 0.2 | 0.13 | 0.15 | 1.63 |
| | MIT | (Number of times) | 962 | 1037 | 924 | 1292 | 1154 | 133 | 1061 | 851 |
| | Re | nm | 0.3 | 0.2 | 0.5 | 0.4 | 0.4 | 0.2 | 0.6 | 0.4 |
| | Rth | nm | −0.3 | −0.8 | −1.4 | −1.3 | −4.1 | 0.3 | −5.2 | 0.0 |
| | Evaluation of appearance of film | | Good | Good | Good | Good | Good | Good | Good | Good |
| Physical properties of uniaxially-stretched film | Re | nm | 3.2 | 0.3 | 1.5 | 1.2 | 13.3 | 1.4 | 14.0 | 0.4 |
| | Rth | nm | 0.8 | −0.2 | −1.3 | −1.1 | −7.1 | 0.2 | −7.7 | −0.2 |

TABLE 6

| | | | Example 10 | Example 11 | Example 12 | Example 13 | Comparative Example 14 |
|---|---|---|---|---|---|---|---|
| Acrylic resin (A) | | Type | A2 | A2 | A2 | A2 | A2 |
| | | (parts) | 85 | 85 | 85 | 85 | 100 |
| Graft copolymer (B) | | Type | B5 | B6 | B7 | B8 | — |
| | | (parts) | 15 | 15 | 15 | 15 | — |
| Physical properties of biaxially-stretched film | Film thickness | (μm) | 40 | 40 | 40 | 40 | 40 |
| | Glass transition temperature (DSC) | (° C.) | 129 | 129 | 129 | 129 | 130 |
| | Total light transmittance | (%) | 92.1 | 92.2 | 92 | 92.1 | 92.1 |
| | Haze value | (%) | 2.29 | 3.34 | 0.75 | 0.70 | 0.23 |
| | Inner haze value | (%) | 0.39 | 0.41 | 0.10 | 0.12 | 0.06 |
| | MIT | (Number of times) | 690 | 846 | 745 | 741 | 96 |
| | Re | nm | 1.0 | 0.8 | 1.0 | 0.9 | 1.3 |
| | Rth | nm | −4.0 | −2.9 | −2.8 | −3.7 | −8.4 |
| | Evaluation of appearance of film | | Good | Good | Good | Good | Good |
| !Physical properties of uniaxially-stretched film | Re | nm | 1.8 | 1.3 | 2.0 | 1.0 | 3.9 |
| | Rth | nm | −1.4 | −0.9 | −1.7 | −1.1 | −3.2 |

Comparative Example 15

<Production of Graft Copolymer (B14)>

At first, Example 17 of JP09-309938 was repeated based on the description on Table 5 in reference to Example 6 on Table 3 of the same document to prepare the multi-layer acrylic polymer (i.e. graft copolymer). The detail is as follows:

The following materials were fed into a polymerization apparatus having a capacity of 8 liters and equipped with a stirrer.

Air in the polymerization apparatus was sufficiently purged with nitrogen gas, and then the temperature in the polymerization apparatus was set to 80° C. Next, added was 22.5 parts of "innermost-layer monomer mixture" containing 92.5 parts of methyl methacrylate (MMA), 7.5 parts of methyl acrylate (MA), 0.1125 parts of allyl methacrylate (AMA), 0.225 parts of 1,3-butylene glycol dimethacrylate (BDMA), 0.06 parts of phosphanol LO-529. Then, 0.03 parts of potassium persulfate was fed as a 2% aqueous solution, and polymerization was continued for 60 minutes to obtain a polymer (I). The polymerization conversion ratio was 98.9%.

Then, 0.12 parts of potassium persulfate was added as a 2% aqueous solution. Then 40 parts of "intermediate-layer monomer mixture" containing 73 parts of butyl acrylate (BA), 27 parts of benzyl acrylate (BzA), 0.6 parts of allyl methacrylate (AMA), 0.08 parts of 1,3-butylene glycol dimethacrylate (BDMA), 0.3 parts of phosphanol LO-529 were continuously added for 192 minutes. After the completion of the addition, polymerization was continued for 120 minutes to obtain a polymer (II). The polymerization conversion ratio was 100%, and the average particle diameter was 221 nm.

Then, $2.5 \times 10^{-5}$ parts of ferrous (II) sulfate, $7.5 \times 10^{-5}$ parts of ethylenediaminetetraacetic acid disodium salt dehydrate, and 0.1 parts of sodium formaldehyde sulfoxylate were added so that the redox reaction was induced. Then, 37.5 parts of "outer-layer monomer mixture" containing 90 parts of methyl methacrylate (MMA), and 10 parts of methyl acrylate (MA), mixed with 0.06 parts of cumene hydroperoxide were continuously added for 120 minutes. After the completion of the addition, polymerization was continued for 60 minutes to obtain a graft copolymer latex. The polymerization conversion ratio was 100%. The obtained latex was coagulated by salting out using calcium acetate, washed with water, and dried to obtain a graft copolymer (B14).

<Preparation of Molded Article>

In accordance with the description on paragraphs [0276]-[0278], Example 3 of the instant specification was repeated to prepare pellets, and then prepare various test pieces (molded articles) by injection molding, which were subjected to various evaluations, except that the graft copolymer (B14) prepared above was employed instead of the graft copolymer (B1) in Example 3.

The results of the evaluations are as follows:

| | |
|---|---|
| Tensile elongation (%): | 64.9 |
| Izod (kJ/m2): | 2.7 |
| Gardner impact (kg · cm): | 36.9 |
| Crossed Nicols test: | B |
| Total light transmittance (%): | 85.3 |
| Maximum phase difference (nm): | 38 |
| Haze (%): | 5.91 |
| Transparent YI: | 7.55 |
| MFR@3.8 kg (g/10 min): | 0.9 |
| HDT (° C.): | 105.3 |

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A resin composition for an injection molded article comprising an acrylic resin and a graft copolymer,
    wherein the graft copolymer comprises an innermost layer, an inner layer, and an outer layer:
    wherein the innermost layer is a hard polymer (A) comprising, as structural units, a monomer mixture (a) comprising 1 to 40 wt % of benzyl (meth)acrylate, 60 to 99 wt % of an alkyl methacrylate ester, 0 to 35 wt % of an alkyl acrylate ester, and 0 to 15 wt % of another monomer having a double bond and copolymerizable with the benzyl (meth)acrylate, the alkyl methacrylate ester, and the alkyl acrylate ester; and 0.01 to 10 parts by weight of a polyfunctional monomer per 100 parts by weight of a total amount of the monomer mixture (a),
    wherein the inner layer is a soft polymer (B) comprising, as structural units, a monomer mixture (b) comprising 40 to 99 wt % of an alkyl acrylate ester, 1 to 60 wt % of benzyl (meth)acrylate, and 0 to 40 wt % of another monomer having a double bond and copolymerizable with the alkyl acrylate ester and the benzyl (meth)acrylate; and 0.1 to 5 parts by weight of a polyfunctional monomer per 100 parts by weight of a total amount of the monomer mixture (b),
    wherein the outer layer is a hard polymer (C) comprising, as structural units, a monomer mixture (c) comprising 60 to 100 wt % of an alkyl methacrylate ester, 0 to 10 wt % of benzyl (meth)acrylate, and 40 to 0 w % of another monomer having a double bond and copolymerizable with the alkyl methacrylate ester and the benzyl (meth)acrylate and 0 to 10 parts by weight of a polyfunctional monomer (per 100 parts by weight of a total amount of the monomer mixture (c)), and
    wherein, when the resin composition is molded to obtain a molded article having a thickness of 2 mm, the molded article has a haze of 1% or less.

2. The resin composition according to claim 1, wherein the another monomer in the monomer mixture (c) is one or more selected from the group consisting of: an alkyl acrylate ester; an aromatic vinyl monomer; and an unsaturated nitrile-based monomer.

3. The resin composition according to claim 1, wherein a polymer obtained by performing up to polymerization for forming the inner layer of the graft copolymer has an average particle diameter of 50 to 400 nm.

4. The resin composition according to claim 1, wherein the acrylic resin has a glass transition temperature of 115° C. or higher.

5. The resin composition according to claim 4, wherein the acrylic resin comprises at least one selected from the group consisting of: a glutarimide acrylic resin; a maleimide acrylic resin; a partially-hydrogenated styrene unit-containing acrylic polymer; an acrylic polymer having a cyclic acid anhydride structure; an acrylic polymer comprising 97 to 100 wt % of methyl methacrylate and 3 to 0 wt % of methyl acrylate; and an acrylic polymer containing a hydroxyl group and/or a carboxyl group.

6. The resin composition according to claim 1, wherein the resin composition comprises, relative to 100 parts by weight of a total amount of the acrylic resin and the graft copolymer:
    40 to 98 parts by weight of the acrylic resin; and
    60 to 2 parts by weight of the graft copolymer.

7. The resin composition according to claim 1, wherein when the resin composition is molded to obtain a molded article having a thickness of 2 mm, the molded article has a haze of 2% or less.

8. An injection molded article comprising the resin composition according to claim 1.

9. The molded article according to claim 8, wherein when the molded article has a thickness of 2 mm, the molded article has a YI value of 4 or less.

10. The molded article according to claim 8, wherein when the molded article has a thickness of 2 mm, the molded article has a maximum phase difference of 300 nm or less.

11. A method for producing a resin composition for an injection molded article comprising an acrylic resin and a graft copolymer, the method comprising polymerizing the graft copolymer by multistage polymerization comprising the following polymerization stages (I), (II) and (III):
- (I) obtaining a hard polymer (A) by polymerizing 100 parts by weight of a monomer mixture (a) comprising 1 to 40 wt % of benzyl (meth)acrylate, 60 to 99 wt % of an alkyl methacrylate ester, 0 to 35 wt % of an alkyl acrylate ester, and 0 to 15 wt % of another monomer having a double bond and copolymerizable with the benzyl (meth)acrylate, the alkyl methacrylate ester, and the alkyl acrylate ester; and 0.01 to 10 parts by weight of a polyfunctional monomer;
- (II) obtaining a soft polymer (B) by polymerizing 100 parts by weight of a monomer mixture (b) comprising 40 to 99 wt % of an alkyl acrylate ester, 1 to 60 wt % of benzyl (meth)acrylate, and 0 to 40 wt % of another monomer having a double bond and copolymerizable with the alkyl acrylate ester and the benzyl (meth)acrylate; and 0.1 to 5 parts by weight of a polyfunctional monomer; and
- (III) obtaining a hard polymer (C) by polymerizing, in the presence of the soft polymer (B), 100 parts by weight of a monomer mixture (c) comprising 60 to 100 wt % of an alkyl methacrylate ester, 0 to 10 wt % of benzyl (meth)acrylate, and 40 to 0 w % of another monomer having a double bond and copolymerizable with the alkyl methacrylate ester and the benzyl (meth)acrylate; and 0 to 10 parts by weight of a polyfunctional monomer;

wherein, when the resin composition is molded to obtain a molded article having a thickness of 2 mm, the molded article has a haze of 1% or less.

* * * * *